US011479462B1

(12) United States Patent
Spicer

(10) Patent No.: US 11,479,462 B1
(45) Date of Patent: Oct. 25, 2022

(54) HYDROCARBON REFORMING PROCESSES WITH SHAFT POWER PRODUCTION

(71) Applicant: ExxonMobil Chemical Patents Inc., Baytown, TX (US)

(72) Inventor: David Spicer, Houston, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 0 days.

(21) Appl. No.: 17/483,960

(22) Filed: Sep. 24, 2021

(51) Int. Cl.
*C01B 3/38* (2006.01)
*C10G 9/36* (2006.01)
*C01B 3/36* (2006.01)

(52) U.S. Cl.
CPC .............. *C01B 3/382* (2013.01); *C01B 3/36* (2013.01); *C10G 9/36* (2013.01); *C01B 2203/0233* (2013.01); *C01B 2203/062* (2013.01); *C01B 2203/0883* (2013.01); *C01B 2203/84* (2013.01); *C10G 2400/20* (2013.01)

(58) Field of Classification Search
CPC ... C01B 3/382; C01B 3/36; C01B 2203/0233; C01B 2203/062; C01B 2203/0883; C01B 2203/84; C10G 9/36; C10G 2400/20
See application file for complete search history.

(56) References Cited

U.S. PATENT DOCUMENTS

| | | | |
|---|---|---|---|
| 4,869,894 A | 9/1989 | Wang et al. | |
| 8,021,464 B2 | 9/2011 | Gauthier et al. | |
| 8,460,630 B2 | 6/2013 | Niitsuma et al. | |
| 8,576,200 B2* | 11/2013 | Zhu | G06F 3/0428 345/175 |
| 9,216,903 B2 | 12/2015 | McKenna et al. | |
| 9,580,314 B2 | 2/2017 | Darde et al. | |
| 11,021,365 B2 | 6/2021 | Van Willigenburg | |
| 2009/0117024 A1 | 5/2009 | Weedon et al. | |
| 2010/0126180 A1 | 5/2010 | Forsyth et al. | |
| 2019/0023567 A1* | 1/2019 | Saloway | C01B 3/38 |

FOREIGN PATENT DOCUMENTS

WO 2020/131981 6/2020

OTHER PUBLICATIONS

U.S. Appl. No. 17/483,939, filed Sep. 24, 2021, Entitled "Production of Hydrogen-Rich Fuel-Gas with Reduced CO2 Emission" Spicer et al.

(Continued)

*Primary Examiner* — Jafar F Parsa
(74) *Attorney, Agent, or Firm* — ExxonMobil Chemical Patents Inc.; Siwen Chen

(57) ABSTRACT

A high-pressure steam stream produced from the waste heat recovery system of a syngas producing unit may be superheated and then supplied to a steam turbine in a hydrocarbon production plant to produce an expanded steam stream and shaft power. A portion of the expanded stream can be fed into the reforming reactor in the syngas producing unit. The shaft power can be used to drive compressors and pumps in an olefins production plant. Considerable energy efficiency and capital investment savings can be realized by such steam integration compared to running the olefins production plant separately.

23 Claims, 5 Drawing Sheets

(56) References Cited

OTHER PUBLICATIONS

U.S. Appl. No. 17/484,042, filed Sep. 24, 2021, Entitled "Integration of Hydrogen-Rich Fuel-Gas Production with Olefins Production Plant" Spicer et al.
U.S. Appl. No. 17/484,068, filed Sep. 24, 2021, Entitled "Amine CO2 Separation Process Integrated with Hydrocarbons Processing" Spicer et al.
IEAGHG Technical Review 2017-TR3 Mar. 2017 Reference Data and Supporting Literature Reviews for SMR Based Hydrogen Production with CCS, IEA Greenhouse Gas R&D Programme, 131 pages.
IEAGHG, "Techno-Economic Evaluation of SMR Based Stand-alone (Merchant) Plant with CCS", Feb. 2017, Feb. 2017, 286 pages.
Ullman's Encyclopedia of Industrial Chemistry, vol. 18, 2012, "Hydrogen, 2. Production" pp. 258-268.

* cited by examiner

HYDROCARBON REFORMING PROCESSES WITH SHAFT POWER PRODUCTION

FIELD

This disclosure relates to hydrocarbon reforming processes such as natural gas reforming processes for producing syngas and/or $H_2$-rich fuel gas. In particular, this disclosure relates to hydrocarbon reforming processes integrated with an olefins production plant.

BACKGROUND

Ethylene and propylene (light olefins) are two of the highest volume petrochemical products manufactured. The polymer products into which they are converted have numerous applications in society ranging from food wrap films that extend produce shelf life to light-weight automotive components that contribute to reduced fuel consumption. The majority of ethylene and propylene are manufactured from hydrocarbon feedstocks by the so-called steam-cracking process in an olefins product plant. In this process the hydrocarbon feed, in the presence of steam, is subjected to very high temperatures for very short reaction times, producing a mixed product stream rich in ethylene and propylene, but also containing molecules ranging from hydrogen to fuel-oil. This mixed product stream is then immediately cooled and separated to produce a process gas stream comprising C1-C4 hydrocarbons including ethylene and propylene. The process gas stream is then compressed to a higher pressure, cooled to a very low temperature in a chill chain, and separated in distillation columns to recover, among others, an ethylene product stream and a propylene product stream. Steam turbines are typically utilized in the olefins production plant. Superheated steam streams are generated to supply the steam turbines.

Syngas, a mixture comprising primarily $H_2$ and CO, optionally $CO_2$, and optionally $CH_4$, with various purity levels may be produced by using hydrocarbon steam reforming such as methane reforming in a syngas producing unit. The reforming may occur in a reforming reactor such as steam-methane-reformer ("SMR") where methane and steam, upon being heated to a high temperature, react in the presence of a reforming catalyst to produce a reformed stream comprising $H_2$, CO, and steam exiting the SMR. Heat energy can be recovered from the high-temperature reformed stream to produce steam at various pressures and a cooled reformed stream. Upon steam abatement, a first syngas stream may be produced from the cooled reformed stream. Alternatively or additionally, the cooled reformed stream may undergo a shift reaction in the presence of a shift catalyst to convert a portion of CO and steam therein into $CO_2$ and $H_2$ and to produce a shifted stream comprising $H_2$, CO, $CO_2$, and $H_2O$. Upon steam abatement, a second syngas comprising $H_2$, CO, and $CO_2$ can be produced. Upon $CO_2$ recovery from the second syngas, a third syngas comprising $H_2$ and CO may be produced. If the third syngas comprises a low concentration of CO, the third syngas is a $H_2$-rich gas suitable as a fuel gas stream. An $H_2$-rich gas may be further purified to produce $H_2$ product with various levels of purity by using, e.g., a pressure-swing unit.

There is a need to improve energy efficiency of an olefins production plant and a syngas production unit. This disclosure satisfies this and other needs.

SUMMARY

A process for producing syngas and/or an $H_2$-rich fuel gas typically comprises feeding a hydrocarbon feed (e.g., a natural gas stream) and a steam feed into a syngas producing unit comprising a reforming reactor under syngas producing conditions to produce a reformed stream exiting the reforming reactor, followed by recovering heat from the reformed stream by using a waste-heat recovery unit to produce a reformed stream and generate a high-pressure steam ("HPS") stream. It has been found that, by superheating the HPS stream, expanding the thus obtained super-heated HPS ("SH-HPS") stream to produce an expanded steam stream having a pressure equal to or greater than that of the steam feed, and then supplying at least a portion of the expanded steam stream to the reforming reactor, useful shaft power can be generated and an improved energy efficiency compared to existing processes can be achieved. When the process is integrated with an olefin production plant, one can achieve considerably improved energy efficiency and appreciably reduced $CO_2$ emission from the olefins production plant compared to running the olefins production plant separately.

Thus, a first aspect of this disclosure relates to a process comprising: (A) supplying a hydrocarbon feed and a steam feed into a syngas producing unit comprising a reforming reactor under syngas producing conditions to produce a reformed stream exiting the reforming reactor, wherein the syngas producing conditions include the presence of a reforming catalyst, and the reformed stream comprises $H_2$, CO, and steam; (B) cooling the reformed stream by using a waste heat boiler ("WHB") to produce a cooled reformed stream and to generate a high-pressure steam ("HPS") stream; (C) heating the HPS stream to obtain a super-heated high-pressure steam ("SH-HPS") stream, wherein the SH-HPS stream has a pressure higher than the steam feed supplied to the syngas producing unit in step (A); (D) expanding at least a portion of the SH-HPS stream in at least one steam turbine to produce shaft power and an expanded steam stream having a pressure equal to or higher than the steam feed, wherein the at least one steam turbine is located in a hydrocarbon production plant; and (E) supplying at least a portion of the expanded steam stream as the steam feed in step (A).

DETAILED DESCRIPTION

Figure 1:
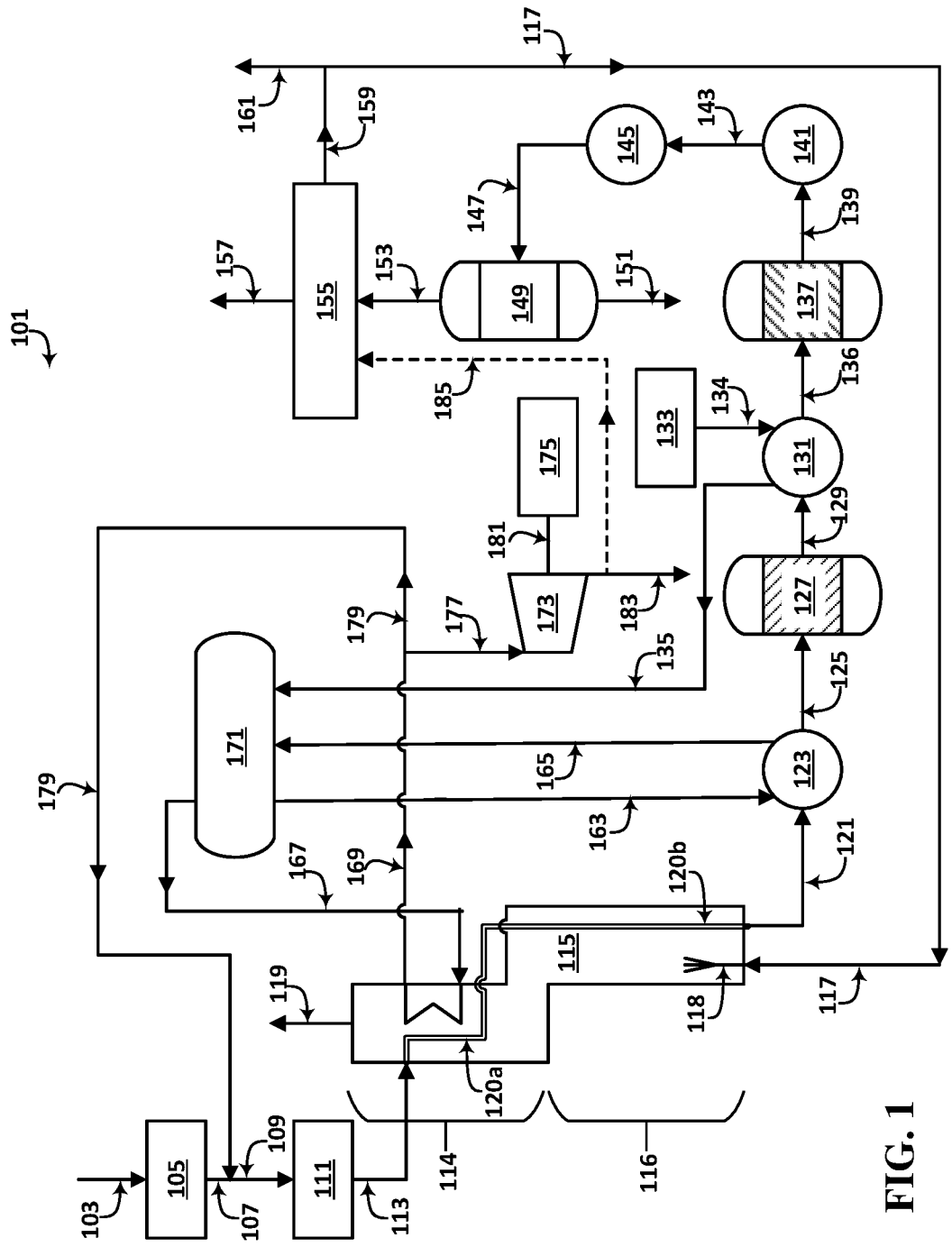
FIG. 1 schematically illustrates certain processes and systems for producing a $H_2$-rich stream including an SMR according to certain embodiments of this disclosure.

Various specific embodiments, versions and examples of the invention will now be described, including preferred embodiments and definitions that are adopted herein for purposes of understanding the claimed invention. While the following detailed description gives specific preferred embodiments, those skilled in the art will appreciate that these embodiments are exemplary only, and that the invention may be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

In this disclosure, a process is described as comprising at least one "step." It should be understood that each step is an action or operation that may be carried out once or multiple times in the process, in a continuous or discontinuous fashion. Unless specified to the contrary or the context clearly indicates otherwise, multiple steps in a process may be conducted sequentially in the order as they are listed, with or without overlapping with one or more other steps, or in any other order, as the case may be. In addition, one or more or even all steps may be conducted simultaneously with regard to the same or different batch of material. For example, in a continuous process, while a first step in a process is being conducted with respect to a raw material just fed into the beginning of the process, a second step may be carried out simultaneously with respect to an intermediate material resulting from treating the raw materials fed into the process at an earlier time in the first step. Preferably, the steps are conducted in the order described.

Unless otherwise indicated, all numbers indicating quantities in this disclosure are to be understood as being modified by the term "about" in all instances. It should also be understood that the precise numerical values used in the specification and claims constitute specific embodiments. Efforts have been made to ensure the accuracy of the data in the examples. However, it should be understood that any measured data inherently contains a certain level of error due to the limitation of the technique and/or equipment used for acquiring the measurement.

Certain embodiments and features are described herein using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated.

The indefinite article "a" or "an", as used herein, means "at least one" unless specified to the contrary or the context clearly indicates otherwise. Thus, embodiments using "a reactor" or "a conversion zone" include embodiments where one, two or more reactors or conversion zones are used, unless specified to the contrary or the context clearly indicates that only one reactor or conversion zone is used.

The term "hydrocarbon" means (i) any compound consisting of hydrogen and carbon atoms or (ii) any mixture of two or more such compounds in (i). The term "Cn hydrocarbon," where n is a positive integer, means (i) any hydrocarbon compound comprising carbon atom(s) in its molecule at the total number of n, or (ii) any mixture of two or more such hydrocarbon compounds in (i). Thus, a C2 hydrocarbon can be ethane, ethylene, acetylene, or mixtures of at least two of these compounds at any proportion. A "Cm to Cn hydrocarbon" or "Cm-Cn hydrocarbon," where m and n are positive integers and m<n, means any of Cm, Cm+1, Cm+2, . . . , Cn−1, Cn hydrocarbons, or any mixtures of two or more thereof. Thus, a "C2 to C3 hydrocarbon" or "C2-C3 hydrocarbon" can be any of ethane, ethylene, acetylene, propane, propene, propyne, propadiene, cyclopropane, and any mixtures of two or more thereof at any proportion between and among the components. A "saturated C2-C3 hydrocarbon" can be ethane, propane, cyclopropane, or any mixture thereof of two or more thereof at any proportion. A "Cn+ hydrocarbon" means (i) any hydrocarbon compound comprising carbon atom(s) in its molecule at the total number of at least n, or (ii) any mixture of two or more such hydrocarbon compounds in (i). A "Cn− hydrocarbon" means (i) any hydrocarbon compound comprising carbon atoms in its molecule at the total number of at most n, or (ii) any mixture of two or more such hydrocarbon compounds in (i). A "Cm hydrocarbon stream" means a hydrocarbon stream consisting essentially of Cm hydrocarbon(s). A "Cm-Cn hydrocarbon stream" means a hydrocarbon stream consisting essentially of Cm-Cn hydrocarbon(s).

For the purposes of this disclosure, the nomenclature of elements is pursuant to the version of the Periodic Table of Elements (under the new notation) as provided in Hawley's Condensed Chemical Dictionary, 16th Ed., John Wiley & Sons, Inc., (2016), Appendix V.

"High-pressure steam" and "HPS" are used interchangeably to mean a steam having an absolute pressure of at least 4000 kilopascal ("kPa"). "Super-high-pressure steam" and "Super-HPS" are used interchangeably to mean a steam having an absolute pressure of at least 8,370 kPa. Thus, a Super-HPS is an HPS. "Medium-pressure steam" and "MPS" are used interchangeably to mean a steam having an absolute pressure of at least 800 kPa but less than 4,000 kPa. "Low-pressure steam" and "LPS" are used interchangeably to mean a steam having an absolute pressure of at least 200 kPa but less than 800 kPa.

"Consisting essentially of" means comprising ≥60 mol %, preferably ≥75 mol %, preferably ≥80 mol %, preferably ≥90 mol %, preferably ≥95 mol %; preferably 98 mol %, of a given material or compound, in a stream or mixture, based on the total moles of molecules in the stream or mixture.

A turbine is a steam turbine in this disclosure unless the context clearly indicates otherwise. A "hydrocarbon production plant" is a facility in which a hydrocarbon product is produced. Non-limiting examples of hydrocarbon production plants include: an olefins production plant that produce at least one olefin product such as ethylene and propylene; and a refinery that produces at least one hydrocarbon product, e.g., a benzene product, a gasoline product, and the like.

I. The Hydrocarbon Reforming Process and the Syngas Producing Unit

A first aspect of this disclosure relates to a hydrocarbon reforming process generally comprising the following steps: (A) supplying a hydrocarbon feed and a steam feed into a syngas producing unit comprising a reforming reactor under syngas producing conditions to produce a reformed stream exiting the reforming reactor, wherein the syngas producing conditions include the presence of a reforming catalyst, and the reformed stream comprises H2, CO, and steam; (B) cooling the reformed stream by using a waste heat boiler ("WHB") to produce a cooled reformed stream and to generate a high-pressure steam ("HPS") stream; (C) heating the HPS stream to obtain a super-heated high-pressure steam ("SH-HPS") stream, wherein the SH-HPS stream has a pressure higher than the steam feed supplied to the syngas producing unit in step (A); (D) expanding at least a portion of the SH-HPS stream in at least one steam turbine to produce shaft power and an expanded steam stream having a pressure equal to or higher than the steam feed; and (E) supplying at least a portion of the expanded steam stream as the steam feed in step (A).

Step (A) of this process includes supplying a hydrocarbon feed and a steam feed into a syngas producing unit comprising a reforming reactor under syngas producing conditions to produce a reformed stream exiting the reforming reactor, wherein the syngas producing conditions include the presence of a reforming catalyst, and the reformed stream comprises $H_2$, CO, and steam. The hydrocarbon feed can consist essentially of C1-C4 hydrocarbons (preferably saturated), preferably consists essentially of C1-C3 hydrocarbons (preferably saturated), preferably consists essentially of C1-C2 hydrocarbons (preferably saturated), and preferably consists essentially of $CH_4$. The hydrocarbon feed and the steam feed may be combined to form a joint stream before being fed into the syngas producing unit. Alternatively, they may be fed into the syngas producing unit as separate streams, in which they admix with each other to form a mixture. The feed stream(s) can be pre-heated by, e.g., a furnace, a heat exchanger, and the like, before being fed into the syngas producing unit. The syngas producing unit can comprise a pre-reformer first receiving the feed stream(s), especially if the hydrocarbon feed comprises significant amount of C2+ hydrocarbons. In a pre-reformer, the hydrocarbon feed/steam feed mixture contacts a pre-reforming catalyst under conditions such that the C2+ hydrocarbons are preferentially converted into $CH_4$. The inclusion of a pre-reformer can reduce coking and fouling of the down-stream reforming reactor. The hydrocarbon feed may have a temperature from, e.g., 15° C., 20° C., 30° C., 40° C., to 50° C., 60° C., 70° C., 80° C., 90° C., to 95° C., 100° C., 110° C., 120° C., 130° C., 140° C., or even 150° C., and an absolute pressure from e.g., 1,300 kPa, 1,400 kPa, 1,500 kPa, 1,600 kPa, 1,700 kPa, 1,800 kPa, 1,900 kPa, 2,000 kPa, to 2,100 kPa, 2,200 kPa, 2,300 kPa, 2,400 kPa, 2,500 kPa, 2,600 kPa, 2,700 kPa, 2,800 kPa, 2,900 kPa, 3,000 kPa, to 3,000 kPa, 3,200 kPa, 3,400 kPa, 3,500 kPa, 3,600 kPa, 3,800 kPa, 4,000 kPa, to 4,200 kPa, 4,400 kPa, 4,500 kPa, 4,600 kPa, 4,800 kPa, or even 5,000 kPa. The steam feed may have a temperature from, e.g., 250° C., 260° C., 270° C., 280° C., 290° C., 300° C., to 310° C., 320° C., 330° C., 340° C., 350° C., 360° C., 370° C., 380° C., 390° C., to 400° C., 410° C., 420° C., 430° C., 440° C., or even_450_° C., and an absolute pressure from e.g., 1,300 kPa, 1,400 kPa, 1,500 kPa, 1,600 kPa, 1,700 kPa, 1,800 kPa, 1,900 kPa, 2,000 kPa, to 2,100 kPa, 2,200 kPa, 2,300 kPa, 2,400 kPa, 2,500 kPa, 2,600 kPa, 2,700 kPa, 2,800 kPa, 2,900 kPa, 3,000 kPa, to 3,000 kPa, 3,200 kPa, 3,400 kPa, 3,500 kPa, 3,600 kPa, 3,800 kPa, 4,000 kPa, to 4,200 kPa, 4,400 kPa, 4,500 kPa, 4,600 kPa, 4,800 kPa, or even 5,000 kPa. Preferably, the steam feed is a superheated steam.

The effluent from the pre-reformer can be then fed into the reforming reactor operated under syngas producing conditions, wherein the forward reaction of the following is favored and desirably occurs in the presence of the reforming catalyst:

(R-1)

$$CH_4 + H_2O \xrightleftharpoons{\text{Reforming Catalyst}} CO + 3H_2$$

The syngas producing condition can include a temperature of, e.g., from 750° C., 760° C., 780° C., 800° C., 850° C., 900° C., to 950° C., 1,000° C., 1,050° C., 1,100° C., to 1150° C., or even 1200° C., and an absolute pressure of, e.g., from 700 kPa, 800 kPa, 900 kPa, 1,000 kPa, to 1,500 kPa, 2,000 kPa, 2,500 kPa, 3,000 kPa, to 3,500 kPa, 4,000 kPa, 4,500 kPa, or even 5,000 kPa, in the reforming reactor, depending on the type of the reforming reactor and the syngas producing conditions. A lower pressure in the reformed stream, and hence a lower pressure in the reforming reactor, is conducive to a higher conversion of $CH_4$ in reforming reactor and hence a lower residual $CH_4$ concentration in the reformed stream. The reformed stream exiting the reforming reactor therefore comprises CO, $H_2$, residual $CH_4$ and $H_2O$, and optionally $CO_2$ at various concentrations depending on, among others, the type of the reforming reactor and the syngas producing conditions. The reformed stream can have a temperature of, e.g., from 750° C., 760° C., 780° C., 800° C., 850° C., 900° C., to 950° C., 1,000° C., 1,050° C., 1,100° C., to 1150° C., or even 1200° C., and an absolute pressure of, e.g., from 700 kPa, 800 kPa, 900 kPa, 1,000 kPa, to 1,500 kPa, 2,000 kPa, 2,500 kPa, 3,000 kPa, to 3,500 kPa, 4,000 kPa, 4,500 kPa, or even 5,000 kPa, depending on the type of the reforming reactor and the syngas producing conditions.

A preferred type of the reforming reactor in the syngas producing unit is an SMR. An SMR typically comprises one or more heated reforming tubes containing the reforming catalyst inside. The hydrocarbon/steam feed stream enters the tubes, heated to a desired elevated temperature, and passes through the reforming catalyst to effect the desirable reforming reaction mentioned above. While an SMR can have many different designs, a preferred SMR comprises a furnace enclosure, a convection section (e.g., an upper convection section), a radiant section (e.g., a lower radiant section), and one or more burners located in the radiant section combusting a fuel to produce a hot flue gas and supply thermal energy to heat the radiant section and the convection section. The hydrocarbon/steam feed stream enters the reforming tube at a location in the convection section, winds downwards through the convection section, whereby it is pre-heated by the ascending hot flue gas produced from fuel combustion at the burner(s), and then enters the radiant section proximate the burners combustion flames, whereby it contacts the reforming catalyst loaded in the reforming tube(s) in the radiant section, to produce a reformed stream exiting the SMR from a location in the radiant section. The syngas producing conditions in the reforming tube(s) in the radiant section can include a temperature of, e.g., from 750° C., 760° C., 780° C., 800° C., to 820° C., 840° C., 850° C., to 860° C., 880° C., or even 900° C., and an absolute pressure of, e.g., from 700 kPa, 800 kPa, 800 kPa, 900 kPa, 1,000 kPa, to 1,500 kPa, 2,000 kPa, 2,500 kPa, 3,000 kPa, or even 3,500 kPa. To achieve a high $CH_4$ conversion in the SMR, and a low $CH_4$ concentration in the $H_2$-rich stream produced from the process, the syngas producing conditions in the SMR preferably includes an absolute pressure of ≤2,169 kPa (300 psig), more preferably ≤1,825 kPa (250 psig). Description of an SMR can be found in, e.g., The International Energy Agency Greenhouse Gas R&D Program ("IEAGHG"), "Techno-Economic Evaluation of SMR Based Standalone (Merchant) Plant with CCS", February 2017; and IEAGHG, "Reference data and supporting literature Reviews for SMR based Hydrogen production with CCS", 2017-TR3, March 2017, the contents of which are incorporated herein in their entirety.

The reforming reactor in the syngas producing unit may comprise an autothermal reformer ("ATR"). An ATR typically receives the hydrocarbon/steam feed(s) and an $O_2$ stream into a reaction vessel, where a portion of the hydrocarbon combusts to produce thermal energy, whereby the mixture is heated to an elevated temperature and then allowed to contact a bed of reforming catalyst to effect the desirable reforming reaction and produce a reformed stream exiting the vessel. An ATR can be operated at a higher temperature and pressure than an SMR. The syngas producing conditions in the ATR and the reformed stream exiting an ATR can have a temperature of, e.g., from 800° C., 850° C., 900° C., to 950° C., 1,000° C., 1050° C., to 1,100° C., 1,150° C., or even 1,200° C., and an absolute pressure of, e.g., from 800 kPa, 900 kPa, 1,000 kPa, to 1,500 kPa, 2,000 kPa, 2,500 kPa, 3,000 kPa, to 3,500 kPa, 4,000 kPa, 4,500 kPa, or even 5,000 kPa. Commercially available ATRs, such as the Syncor™ ATR available from Haldor Topsoe, having an address at Haldor Topsøes Allé 1, DK-2800, Kgs. Lyngby, Denmark ("Topsoe"), may be used in the process of this disclosure.

The syngas producing unit used in step (A) of the process of this disclosure can include one or more SMR only, one or more ATR only, or a combination of one or more of both.

The reformed stream existing the reforming reactor has a high temperature and high pressure as indicated above. It is highly desirable to capture the heat energy contained therein. Thus, in step (B), the reformed stream passes through a waste heat recovery unit ("WHRU") to produce a cooled reformed stream and to generate a high-pressure steam ("HPS") stream. The cooled reformed stream can have a temperature from, e.g., 285° C., 290° C., 300° C., to 310° C., 320° C., 330° C., 340° C., 350° C., to 360° C., 370° C., 380° C., 390° C., or even 400° C. The cooled reformed stream can have a pressure substantially the same as the reformed stream exiting the reforming reactor. The WHRU can include, e.g., one or more heat exchanger and one or more steam drum in fluid communication with the heat exchanger. The steam drum supplies a water stream to the heat exchanger, where it is heated and can be then returned to the steam drum, where steam is separated from liquid phase water. The HPS stream can have an absolute pressure from, e.g., 4,000 kPa, 5,000 kPa, 6,000 kPa, 7,000 kPa, 8,000 kPa, to 9,000 kPa, 10,000 kPa, 11,000 kPa, 12,000 kPa, 13,000 kPa, or even 14,000 kPa. In certain embodiments, the HPS stream is preferably a Super-HPS stream. The thus produced HPS stream is a saturated steam stream.

To make the HPS stream more useful, it may be further heated in step (C) to produce a superheated HPS ("SH-HPS") stream in, e.g., a furnace. In case the syngas producing unit comprises an SMR having a convection section as described above, the saturated HPS stream may be advantageously superheated in the convection section of the SMR and/or in an auxiliary furnace. In case the syngas producing unit comprises one or more ATR but no SMR, the saturated HPS stream can be superheated in an auxiliary furnace. The auxiliary furnace can include one or more burners combusting a fuel gas stream to supply the needed thermal energy as is known to one skilled in the art. The SH-HPS stream can have one of both of: (i) a temperature from, e.g., 350° C., 360° C., 370° C., 380° C., 390° C., 400° C., to 410° C., 420° C., 430° C., 440° C., 450° C., to 460° C., 470° C., 480° C., 490° C., 500° C., to 510° C., 520° C., 530° C., 540° C., or even 550° C.; and (ii) an absolute pressure from, e.g., e.g., 4,000 kPa, 5,000 kPa, 6,000 kPa, 7,000 kPa, 8,000 kPa, to 9,000 kPa, 10,000 kPa, 11,000 kPa, 12,000 kPa, 13,000 kPa, or even 14,000 kPa. Preferably the SH-HPS stream has a temperature of at least 371° C. and the steam feed in step (A) has an absolute pressure of at least 1700 kPa. The SH-HPS stream has a pressure higher than that of the steam feed supplied to the syngas producing unit in step (A), so that the SH-HPS can be expanded to produce a steam stream having a pressure in the vicinity of the pressure of the steam feed, which can then be supplied to the syngas producing unit as at least a portion of the steam feed. Preferably the SH-HPS stream has a temperature of at least 482° C. and an absolute pressure of at least 10,000 kPa, and the steam feed has an absolute pressure of at least 1,700 kPa (e.g., at least 2,500 kPa). In a preferred embodiment, the SH-HPS stream may be supplied to an HPS header located in an industrial plant, such as an olefins production plant, supplying HPS to suitable equipment consuming SH-HPS. In another embodiment, the SH-HPS stream may be also a Super-HPS stream, and supplied to a Super-HPS header located in an industrial plant, such as an olefins production plant, supplying Super-HPS to suitable equipment consuming superheated Super-HPS.

The steam turbine(s) in step (D) are present in a hydrocarbon production plant, e.g., an oil refinery, an olefins production plant, a biofuel production plant, and the like. These plants typically include equipment consuming shaft power produced by steam turbines, e.g., gas compressors at various power ratings, pumps, electricity generators, and the like.

In step (D), at least a portion of the SH-HPS stream is expanded in at least one steam turbine to produce shaft power and an expanded steam stream having a pressure equal to or higher than that of the steam feed to the syngas producing unit. The expanded steam stream may have a temperature from, e.g., 260° C., 270° C., 280° C., 290° C., 300° C., to 310° C., 320° C., 330° C., 340° C., 350° C., to 360° C., 370° C., 380° C., 390° C., 400° C., or even 405° C. The expanded steam stream has a pressure lower than the SH-HPS stream, which may range from, e.g., 1,380 kPa, 1,400 kPa, 1,500 kPa, 1,600 kPa, 1,700 kPa, 1,800 kPa, 1,900 kPa, 2,000 kPa, to 2,200 kPa, 2,400 kPa, 2,500 kPa, 2,600 kPa, 2,800 kPa, 3,000 kPa, to 3,200 kPa, 3,400 kPa, 3,500 kPa, 3,600 kPa, 3,800 kPa, 4,000 kPa, to 4,200 kPa, 4,400 kPa, or even 4,500 kPa. The expanded steam stream may be an HPS stream, or an MPS stream. The steam turbine may produce multiple exhaust streams in certain embodiments, e.g., an HPS stream and an LPS stream; an HPS stream and a condensable stream supplied to a condenser; an MPS stream and an LPS stream; or an MPS stream and a condensable stream supplied to a condenser.

Step (D) can advantageously include steam integration between a syngas producing unit and an olefins production plant including a steam cracker receiving a hydrocarbon feed and steam operated under steam cracking conditions to produce a steam cracker effluent exiting the steam cracker. The high-temperature steam cracker effluent is immediately cooled by quenching and/or an indirect heat exchanger, where a significant amount of steam may be generated, which can be subsequently superheated in the convection section of the steam cracker. The cooled steam cracker effluent can be then separated to produce, among others, a process gas stream comprising methane, ethane, C2-C4 olefins and dienes. To recover the olefins products from the process gas stream, it is typically first compressed to an elevated pressure, cooled in a chill train under cryogenic conditions, and then separated in distillation columns such as a demethanizer, a deethanizer, a depropanizer, a C2 splitter, a C3 splitter, and the like. To that end, at least three (3) large compressors: a process gas compressor ("PGC"), a propylene refrigeration compressor ("PRC") and an ethylene refrigeration compressor ("ERC") may be used. In a modern, world scale olefins plant, the combined shaft power of these compressors can exceed 100 MW (134,000 hp). This very high shaft power demand is a characteristic of olefins production plants, and differentiates them from most other petrochemical facilities. Typically the large compressors are driven by steam-turbines. The majority of the steam can be generated by the steam produced from cooling the steam cracker effluent as described above. If necessary, boilers are used to make-up the required steam volumes.

Because of the large shaft power requirements of the major compressors, for efficient olefin production it is important that the steam-power cycle be as efficient as possible. A multi-pressure-level steam system with the highest steam pressure level being nominally 100 BarG (1500 psig, or 10.3 MPaG) or higher may be advantageously used. This Super-HPS may be superheated in order to maximize the specific power output (kW power/kg steam consumed) of the turbines. In addition to the large compressor steam turbines, smaller turbine drivers may be used for several services within the olefins production plant (e.g.: cooling water pumps, quench water pumps, boiler-feed water pumps, air compressors, etc.). These turbines can receive HPS, MPS, or LPS streams. In addition, process heating duties existing in the olefins recovery train may be satisfied by condensing one or more HPS, MPS, or LPS stream(s).

In certain embodiments, a single stage of steam turbine is used in step (D). In certain other embodiments, multiple cascading stages of steam turbines may be used, where an expanded steam stream produced from an upstream stage, preferably an HPS stream or an MPS stream, is supplied to a downstream steam turbine, expanded therein to produce a lower pressure steam stream and additional shaft power. The shaft power produced by the one or more steam turbines in step (D) can be used to perform mechanical work such as: driving a generator to produce electrical power transmissible to local and/or distant electrical equipment; driving a compressor or pump located in an industrial plant, such as a process gas compressor, a propylene refrigeration compressor, an ethylene refrigeration compressor, an air compressor, and/or various pumps located in an olefins production plant. The expanded steam stream may be supplied to a steam header with the suitable pressure rating located in any industrial plant such as an olefins production plant. In certain embodiments, the SH-HPS stream obtained in step (C) may be supplied to an olefins production plant at a pressure no less than the maximal pressure required for the operation of any steam turbine having a power rating of at least 1 megawatt (1 MW, or ≥5 MW, or ≥10 MW, or ≥20 MW) in the olefins production plant. In certain preferred embodiments, the SH-HPS stream obtained from step (C) (which may or may not be a Super-HPS stream) may be supplied to a first stage steam turbine that drives a process gas compressor in an olefins production plant, and the expanded steam stream from the first stage steam turbine, which may be an SH-HPS stream or an MPS stream, may be supplied to a second stage steam turbine producing a second expanded steam stream and shaft power driving another process gas compressor, a propylene refrigeration compressor, an ethylene refrigeration compressor, an air compressor, and/or a pump in the olefins production plant. In another embodiment, the SH-HPS stream obtained from step (C) may be supplied to drive one or more process gas compressors, a propylene refrigeration compressor, and an ethylene refrigeration compressor, each producing an expanded steam stream having the same, similar, or different pressure. The expanded steam streams from the first stage and/or the second stage can then be used to provide process heat, or supplied to additional steam turbines, depending on their respective pressures. In addition, one or more of the steam turbines may exhaust a condensable steam stream fed to a condenser to produce a condensate water stream.

While the shaft power produced in step (D) may be used to drive an electricity generator in a power island, in preferred embodiments of this disclosure where the shaft power is used to drive compressors, pumps, and the like in an integrated olefins production plant, such power island can be eliminated or included at a smaller size, resulting in significant capital costs and operation costs.

The cooled reformed stream obtained in step (B) of the reforming process as described above comprises $H_2$, CO, and steam. It can be used for producing syngas. By abating steam from the cooled reformed gas, one can obtain a first syngas comprising CO and $H_2$. Alternatively, one can further subject the cooled reformed stream in one or more stages of shift reactor to convert a portion of the CO and steam into $CO_2$ and $H_2$, followed by steam abatement to obtain a second syngas comprising CO, $H_2$, and $CO_2$. One may further recover the $CO_2$ from the second syngas to produce a third syngas consisting essentially of CO, $H_2$, and optional residual hydrocarbon, with various CO concentration. The first, second, and third syngases may be used for various applications, e.g., industrial heating, ammonia production, and the like. In a preferred embodiment, the third syngas may comprise CO at a very low concentration of, e.g., ≤10 mol %, ≤8 mol %, ≤5 mol %, ≤3 mol %, ≤1 mol %, ≤0.5 mol %, ≤0.1 mol %, based on the total moles of molecules in the third syngas, in which case the third syngas is an $H_2$-rich gas. Such $H_2$-rich gas can be advantageously used as a fuel gas, the combustion of which can produce a flue gas having appreciably lower $CO_2$ emission than combustion of natural gas.

II. The Plant and Process for Producing a $H_2$-Rich Fuel Gas

A particularly advantageous process for producing $H_2$-rich fuel gas comprises: (I) supplying a hydrocarbon feed and a steam feed into a syngas producing unit comprising a reforming reactor under syngas producing conditions to produce a reformed stream exiting the reforming reactor, wherein the syngas producing conditions include the presence of a reforming catalyst, and the reformed stream comprises $H_2$, CO, and steam; (II) cooling the reformed stream by using a waste heat recovery unit ("WHRU") to produce a cooled reformed stream and to generate a high-pressure steam ("HPS") stream; (III) contacting the cooled reformed stream with a first shifting catalyst in a first shift reactor under a first set of shifting conditions to produce a first shifted stream exiting the first shift reactor, wherein the first shifted stream has a lower CO concentration and a higher $CO_2$ concentration than the cooled reformed stream; (IV) cooling the first shifted stream to obtain a cooled first shifted stream; (V) contacting the cooled first shifted stream with a second shifting catalyst in a second shift reactor under a second set of shifting conditions to produce a second shifted stream exiting the second shift reactor, wherein the second shifted stream has a lower CO concentration and a higher $CO_2$ concentration than the cooled first shifted stream; (VI) abating steam present in the second shifted stream to produce a crude gas mixture stream comprising $CO_2$ and $H_2$; (VII) recovering at least a portion of the $CO_2$ present in the crude gas mixture stream to produce a $CO_2$ stream and a $H_2$-rich stream, wherein the $H_2$-rich stream comprises $H_2$ at a concentration of at least 80 mol %, based on the total moles of molecules in the $H_2$-rich stream; and (VIII) combusting a portion of the $H_2$-rich stream in the presence of an oxidant to generate thermal energy and to produce a flue gas stream. A system for producing such an $H_2$-rich stream, preferably using a process including steps (I) to (VII) above, may be called an $H_2$-rich fuel gas production plant in this disclosure.

Steps (I) and (II) may be identical with steps (A) and (B) of the reforming process described above.

In step (III) of the process, the cooled reformed stream contacts a first shifting catalyst in a first shift reactor under a first set of shifting conditions to produce a first shifted stream exiting the first shift reactor. The first set of shifting conditions includes the presence of a first shift catalyst. Any suitable shift catalyst known to one skilled in the art may be used. Non-limiting examples of suitable shift catalyst for the first shifting catalyst are high temperature shift catalysts available from, e.g., Topsoe. The forward reaction of the following preferentially occur in the first shift reactor:

(R-2)

As such, the first shifted stream has a lower CO concentration and a higher $CO_2$ concentration than the cooled reformed stream. The forward reaction of (R-2) is exothermic, resulting in the first shifted stream having a temperature higher than the cooled reformed stream entering the first shift reactor. The first shifted stream exiting the first shift reactor can have a temperature from, e.g., 335° C., 340° C., 350° C., 360° C., to 370° C., 380° C., 400° C., 420° C., to 440° C., 450° C., 460° C., 480° C., or even 500° C. The first shifted stream can have an absolute pressure substantially the same as the cooled reformed stream.

While a single stage of shift reactor may convert sufficient amount of CO in the cooled reformed stream to $CO_2$ resulting in a low CO concentration in the first shifted stream, it is preferable to include at least two stages of shift reactors in the processes of this disclosure to achieve a high level of conversion of CO to $CO_2$, and eventually to produce a $H_2$-rich fuel gas stream with low CO concentration. It is further preferred that a subsequent stage, such as the second shift reactor downstream of the first shift reactor is operated at a temperature lower than the first shift reactor, whereby additional amount of CO in the first shifted stream is further converted into $CO_2$ and additional amount of $H_2$ is produced. To that end, the first shifted stream is preferably first cooled down in step (IV) to produce a cooled first shifted stream. Such cooling can be effected by one or more heat exchangers using one or more cooling streams having a temperature lower than the first shifted stream. In one preferred embodiment, the first shifted stream can be cooled by the hydrocarbon stream or a split stream thereof to be fed into the syngas producing unit. Alternatively or additionally, the first shifted stream can be cooled by a boiler water feed stream to produce a heated boiler water stream, a steam stream, and/or a water/steam mixture stream. The thus heated boiler water stream can be heated in a boiler to produce steam at various pressure. The thus heated boiler water stream or steam stream can be further heated by another process stream in another heat exchanger to produce steam. In one preferred embodiment, the heated boiler water stream and/or steam stream can be fed into the steam drum of the WHRU extracting heat from the reformed stream as described above, where the boiler feedwater can be sent to the WHRU exchanger for further heating, and any steam separated in the steam drum can be further superheated. The cooled first shifted stream can have a temperature from, e.g., 150° C., 160° C., 170° C., 180° C., 190° C., 200° C., to 210° C., 220° C., 230° C., 240° C., or even 250° C., and a pressure substantially the same as the first shifted stream.

The cooled first shifted stream is then subjected to a low-temperature shifting in a second shift reactor under a second set of shifting conditions to produce a second shifted stream. The second set of shifting conditions includes the presence of a second shift catalyst, which may be the same or different from the first shift catalyst. Any suitable shift catalyst known to one skilled in the art may be used. Non-limiting examples of suitable catalyst for the second shifting catalyst are low temperature shift catalysts available from, e.g., Topsoe. The forward reaction of the following preferentially occur in the first shift reactor:

(R-3)

As such, the second shifted stream has a lower CO concentration and a higher $CO_2$ concentration than the cooled first shifted stream. The forward reaction of (R-3) is exothermic, resulting in the second shifted stream having a temperature higher than the cooled first shifted stream entering the second shift reactor. The second shifted stream exiting the first shift reactor can have a temperature from, e.g., e.g., 150° C., 160° C., 170° C., 180° C., 190° C., 200° C., to 210° C., 220° C., 230° C., 240° C., 250° C., to 260° C., 270° C., 280° C., 290° C., or even 300° C. The second shifted stream can have an absolute pressure substantially the same as the cooled first shifted stream.

The second shifted stream comprises $H_2$, $CO_2$, CO, steam, and optionally $CH_4$. In step (VI), steam is then abated from it by cooling and separation. Similar to step (IV) of cooling the first shifted stream, such cooling of the second shifted stream can be effected by one or more heat exchangers using one or more cooling streams having a temperature lower than the second shifted stream. In one preferred embodiment, the second shifted stream can be cooled by the hydrocarbon stream or a split stream thereof to be fed into the syngas producing unit. Alternatively or additionally, the first shifted stream can be cooled by a boiler water feed stream to produce a heated boiler water stream, a steam stream, and/or a water/steam mixture stream. The thus heated boiler water stream can be heated in a boiler to produce steam at various pressure. The thus heated boiler water stream or steam stream can be further heated by another process stream in another heat exchanger to produce steam. In one preferred embodiment, the heated boiler water stream and/or steam stream can be fed into the steam drum of the WHRU extracting heat from the reformed stream as described above, where the boiler feedwater can be sent to the WHRU exchanger for further heating, and any steam separated in the steam drum can be further superheated. The cooled second shifted stream can preferably comprise water condensate, which can be separated to produce a crude gas mixture stream comprising steam at a significantly lower concentration than the second shifted stream exiting the second shift reactor.

The crude gas mixture stream thus consists essentially of $CO_2$, $H_2$, optionally $CH_4$ at various amounts, and steam and CO as minor components. The crude gas mixture stream can have an absolute pressure from, e.g., 700 kPa, 800 kPa, 800 kPa, 900 kPa, 1,000 kPa, to 1,500 kPa, 2,000 kPa, 2,500 kPa, 3,000 kPa, to 3,500 kPa, 4,000 kPa, 4,500 kPa, or even 5,000 kPa. In step (VII), one can recover a portion of the $CO_2$ therein to produce a $CO_2$ stream and a $H_2$-rich stream. Any suitable $CO_2$ recovery process known to one skilled in the art may be used in step (VII), including but not limited to: (i) amine absorption and regeneration process; (ii) a cryogenic $CO_2$ separation process; (iii) a membrane separation process; (iv) a physical absorption and regeneration process; and (iv) any combination any of (i), (ii), and (iii) above. In a preferred embodiment, an amine absorption and regeneration process may be used. Due to the elevated pressure of the crude gas mixture stream, the size of the $CO_2$ recovery equipment can be much smaller than otherwise required to recover $CO_2$ from a gas mixture at atmospheric pressure.

The $CO_2$ stream preferably comprises $CO_2$ at a molar concentration of from, e.g., 90%, 91%, 92%, 93%, 94%, to 95%, 96%, 97%, 98%, or even 99%, based on the total moles of molecules in the $CO_2$ stream. The $CO_2$ stream can comprise at least one and preferably all of, on a molar basis: (i) e.g., from 0.1%, 0.2%, 0.3%, 0.4%, 0.5%, 0.6%, 0.7%, 0.8%, 0.9%, to 1.0%, 1.5%, 2.0%, 2.5%, 3.0%, 3.5%, 4.5%, or even 5.0% of CO; (ii) e.g., from 0.1%, 0.2%, 0.3%, 0.4%, 0.5%, 0.6%, 0.7%, 0.8%, 0.9%, to 1.0%, 1.5%, 2.0%, 2.5%, 3.0%, 3.5%, 4.5%, 5.0%, 5.5%, or even 6.0% of $H_2O$; and (iii) e.g., from 0.1%, 0.2%, 0.3%, 0.4%, 0.5%, 0.6%, 0.7%, 0.8%, 0.9%, to 1.0%, 1.5%, 2.0%, 2.5%, 3.0%, 3.5%, 4.5%, or even 5.0% of $CH_4$. The $CO_2$ stream can have an absolute pressure from, e.g., 150 kPa, 200 kPa, 300 kPa, 400 kPa, 500 kPa, 600 kPa, 700 kPa, 800 kPa, 800 kPa, 900 kPa, 1,000 kPa, to 1,500 kPa, 2,000 kPa, 2,500 kPa, 3,000 kPa, to 3,500 kPa, 4,000 kPa, 4,500 kPa, or even 5,000 kPa, depending on the $CO_2$ recovery process and equipment used. In a preferred embodiment, where an amine absorption/regeneration $CO_2$ recovery unit is utilized, the $CO_2$ may have an absolute pressure from e.g., 150 kPa, 200 kPa, 250 kPa, 300 kPa, 350 kPa, to 400 kPa, 450 kPa, 500 kPa, 550 kPa, 560 kPa, 570 kPa, 580 kPa, 590 kPa, or even 600 kPa. The $CO_2$ stream can be compressed, liquefied, conducted away, stored, sequestered, or utilized in any suitable applications known to one skilled in the art. In one embodiment, the $CO_2$ stream, upon optional compression, can be conducted away in a $CO_2$ pipeline. In another embodiment, the $CO_2$ stream, upon optional compression and/or liquefaction, can be injected and stored in a geological formation. In yet another embodiment, the $CO_2$ stream, upon optional compression and/or liquefaction, can be used in extracting hydrocarbons present in a geological formation. Another exemplary use of the $CO_2$ stream is in food applications.

The $H_2$-rich stream can have an absolute pressure from, e.g., 700 kPa, 800 kPa, 800 kPa, 900 kPa, 1,000 kPa, to 1,500 kPa, 2,000 kPa, 2,500 kPa, 3,000 kPa, to 3,500 kPa, 4,000 kPa, 4,500 kPa, or even 5,000 kPa. The $H_2$-rich stream preferably comprises $H_2$ at a molar concentration of from, e.g., 80%, 81%, 82%, 83%, 84%, 85%, to 86%, 87%, 88%, 89%, 90%, to 91%, 92%, 93%, 94%, 95%, to 96%, 97%, or even 98%, based on the total moles of molecules in the $H_2$-rich stream. The $H_2$-rich stream can comprise at least one and preferably all of, on a molar basis: (i) e.g., from 0.1%, 0.2%, 0.3%, 0.4%, 0.5%, 0.6%, 0.7%, 0.8%, 0.9%, to 1.0%, 1.5%, 2.0%, 2.5%, or even 3.0%, of CO; (ii) e.g., from 0.1%, 0.2%, 0.3%, 0.4%, 0.5%, to 0.6%, 0.7%, 0.8%, 0.9%, or even 1.0%, of $CO_2$; and (iii) e.g., from 0.1%, 0.2%, 0.3%, 0.4%, 0.5%, 0.6%, 0.7%, 0.8%, 0.9%, to 1.0%, 1.5%, 2.0%, 2.5%, 3.0%, 3.5%, 4.5%, or even 5.0% of $CH_4$. One specific example of a $H_2$-rich stream that may be produced from the process of this disclosure has the following molar composition: 0.25% of $CO_2$; 1.75% of CO; 93.87% of $H_2$; 0.23% of $N_2$; 3.63% of $CH_4$; and 0.29% of $H_2O$.

Where an even higher purity $H_2$ stream is desired, a portion of the $H_2$-rich stream can be further purified by using processes and technologies known to one skilled in the art, e.g., pressure-swing-separation.

Preferably, however, the $H_2$-rich stream, notwithstanding the optional low concentrations of CO, $CO_2$, and $CH_4$, is used as a fuel gas stream without further purification to provide heating in step (VIII) of the process in, e.g., residential, office, and/or industrial applications, preferably industrial applications. Due to the considerably reduced combined concentrations of CO, $CO_2$, and $CH_4$ therein compared to conventional fuel gases such as natural gas, the flue gas stream produced from combusting the $H_2$-rich stream can comprise $CO_2$ at a considerably reduced concentration, resulting in appreciably lower $CO_2$ emission to the atmosphere. Thus, the flue gas stream can comprise $CO_2$ at a molar concentration from, e.g., 0.01%, 0.05%, to 0.1%, 0.2%, 0.3%, 0.4%, 0.5%, 0.6%, 0.7%, 0.8%, 0.9%, to 1%, 2%, 3%, 4%, 5%, 6%, 7%, 8%, 9%, 10%, to 11%, 12%, 13%, 14%, 15%, 16%, 17%, 18%, 19%, or 20%, preferably ≤10%, preferably ≤5%, preferably ≤3%, based on the total moles of $CO_2$ and $H_2O$ in the flue gas stream. The combustion may be in the presence of, e.g., air, $O_2$-enhanced air, high-purity $O_2$, and the like, depending on the specific application.

For use as a fuel gas stream, the $H_2$-rich stream may preferably has an absolute pressure of ≤1,135 kPa (150 psig), preferably ≤790 kPa (100 psig). To achieve such low pressure of the $H_2$-rich stream, it is feasible to design a syngas producing unit upstream comprising an SMR and/or an ATR operating under syngas producing conditions including a relatively low pressure, e.g., an absolute pressure of ≤2,169 kPa (300 psig), preferably ≤1,825 kPa (250 psig). As mentioned above, a lower pressure in the reforming reactor results in a higher $CH_4$ conversion in the reforming reactor, and hence a low residual $CH_4$ concentration in the $H_2$-rich stream.

Preferably, the $H_2$-rich stream is supplied to at least one, preferably a majority, preferably all, of the combustion devices used in the process/system for producing the $H_2$-rich stream. Thus, where the syngas producing unit comprises a pre-reformer including a furnace heated by one or more burners combusting a fuel gas, preferably a portion of the $H_2$-rich stream is supplied as at least a portion, preferably a majority, preferably the entirety, of the fuel gas to such burners. Where the syngas producing unit includes an SMR comprising one or more SMR burners combusting a SMR fuel, it is highly desirable to supply a portion of the $H_2$-rich stream as at least a portion, preferably a majority, preferably the entirety, of the SMR fuel. Where the $H_2$-rich stream production process/system uses an additional boiler or auxiliary furnace combusting a fuel gas, it is desirable supply a portion of the $H_2$-rich stream as at least a portion, preferably a majority, preferably the entirety, of the fuel gas. By combusting the $H_2$-rich stream and capturing the $CO_2$ stream, the $H_2$-rich stream production process/system of this disclosure can reach an appreciably reduced level of $CO_2$ emission to the atmosphere than conventional $H_2$ production processes combusting natural gas.

Compared to existing syngas and/or $H_2$-rich fuel gas producing processes, especially those combusting a hydrocarbon-containing fuel, the $H_2$-rich fuel gas production process of this disclosure has at least one of the following advantages: (i) lower capital investment and production cost due to, e.g., an absence of a PSA unit, a small-size $CO_2$ recovery unit, and operating the syngas producing unit, the first shift reactor, and the second shift gas reactor under relatively low pressure; and (ii) considerably lower $CO_2$ emission if the $CO_2$ stream is captured, stored, sequestered, and/or utilized.

This disclosure is further illustrated by the exemplary but non-limiting embodiments shown in the drawings, which are described below. This disclosure is further illustrated by the exemplary but non-limiting embodiments shown in the drawings, which are described below. In the drawings, the same reference numeral may have similar meanings. In the drawings illustrating an inventive process/system, where multiple initially separate streams are shown to form a joint stream supplied to a next step or device, it should be understood to further include, where appropriate, an alternative where at least one of such multiple separate streams is supplied to the next step or device separately. Where multiple initially separate streams having similar compositions and/or use applications (steam streams generated from differing devices) are shown to form a joint stream supplied to multiple next steps or devices, it should be understood to include, where appropriate, alternatives where at least one of the separate streams and the joint stream is supplied to at least one of the multiple next steps or devices. Thus, where a steam stream X and a steam stream Y, initially separate and generated from differing devices but with similar applications, are shown to form a joint stream Z supplied to two separate turbines A and B, it should be understood to include alternatives where at least one of X, Y, and Z is supplied to at least one of A and B, including but not limited to the following: (i) only stream Z is supplied to A and B; (ii) both of X and Y are supplied, separately, to at least one of A and B; (iii) both of X and Z are supplied, separately, to at least one of A and B; (iv) both of Y and Z are supplied, separately, to at least one of A and B; and (v) only one of X and Y is supplied to at least one of A and B. The drawings are only for the purpose of illustrating certain embodiments of this disclosure, and one skilled in the art appreciates that alternatives thereof may fall within the scope of this disclosure.

FIG. 1

FIG. 1 schematically illustrates processes/systems 101 including an SMR for producing a H₂-rich fuel stream. As shown, a hydrocarbon feed stream 103 (e.g., a natural gas stream comprising primarily CH₄), which may contain CH₄, C2+ hydrocarbons at various concentrations, and sulfur-containing compounds at various concentrations, is first fed into an optional sulfur removal unit 105 to produce a sulfur-abated stream 107, to prevent poisoning catalysts used in the downstream process steps such as the catalyst used in the SMR unit described below. Upon optional preheating via, e.g., a heat exchanger or a furnace (not shown), stream 107 is combined with an HPS stream 179 to form a hydrocarbon/steam mixture stream 109. Upon optional preheating via, e.g., a heat exchanger or a furnace (not shown), stream 109 can be then fed into a pre-reformer 111 which can be an adiabatic reactor containing a pre-reforming catalyst therein. On contacting the pre-reforming catalyst, the heavier C2+ hydrocarbons are preferentially converted into methane (thus preventing the formation of coke in the downstream primary reforming reactor) to produce a pre-reforming effluent 113 comprising methane and steam. Stream 113 is then fed into a tube 120a in the upper section 114, sometimes called convection section, of an SMR 115, where it is heated. SMR 115 comprises a lower section 116, sometimes called radiant section, housing one or more tube 120b which is in fluid communication with tube 120a receiving the stream 113 heated in tube 120a. As shown, in certain embodiments, a tube 120a may exit the convection section to the exterior of the SMR furnace, and then connect with tube(s) 220b, which re-enter the SMR furnace. Multiple tubes 220b may be connected with one tube 220a via one or more manifold (not shown) outside of the SMR furnace housing, though one tube 220b is shown. SMR 115 comprises one or more burners 118 in the radiant section 116, where a SMR fuel combusts to supply energy to the radiant section 116 and then the convection section 114 of SMR 115. For the convenience of illustration, tubes 120a and 120b in the SMR are shown as comprising multiple straight segments. In practice, certain portions of tubes 120a and 120b, particularly tube 120a, may be curved, or even form serpentine windings.

A reforming catalyst is loaded in tube(s) 120b in the radiant section 116. Due to the proximity to the burner(s) 118, the hydrocarbon feed and steam, and the reforming catalyst in tube(s) 120b are heated/maintained at an elevated temperature. The forward reaction of the following preferentially occurs under syngas producing conditions:

$$CH_4 + H_2O \xrightleftharpoons{\text{Reforming Catalyst}} CO + 3\,H_2 \quad \text{(R-1)}$$

In addition, various amounts of CO₂ may be produced in tube(s) 120b. Thus, a reformed stream 121 comprising CO, H₂, residual CH₄, residual H₂O and optionally various amount of CO₂ exits the outlet of tube(s) 120b from the SMR at a temperature of e.g., from 750° C. to 900° C. and an absolute pressure from, e.g., 700 kPa to 3,500 kPa. Stream 121 is then cooled at a waste heat recovery unit ("WHRU") including a waste heat boiler ("WHB") 123 and a steam drum 171 to produce a cooled reformed stream 125 and to generate an HPS stream 167. As shown, a water stream 163 flows from steam drum 171 to WHB 123, and a steam-water mixture stream 165 flows from WHB 123 to steam drum 171.

Stream 167, preferentially a saturated steam stream, can be then heated in the convection section 114 of SMR 115 to produce a super-heated, high-pressure steam ("SP-HP") steam stream 169, which can be fed into a steam header and supplied to any suitable equipment or process step. For example, as shown and described above, a split stream 179 of stream 169 can be combined with the sulfur-abated hydrocarbon feed stream 107 to form a combined stream 109, which is then fed into the pre-reformer 111. For another example, a split stream 177 of stream 169 can be fed into a steam turbine 173, where it is expanded to produce an exhaust steam stream 183 and shaft power. The shaft power can be transferred, via shaft 181, to any suitable equipment 175 to produce useful mechanical work. One example of equipment 175 is an electricity generator, which converts the mechanical work into electrical energy transmissible to any suitable local or distant electrical equipment. Exhaust steam stream 183 can have various residual pressure and temperature suitable for, e.g., driving additional steam turbines, heating other equipment and/or streams, and the like.

As shown in FIG. 1, the cooled reformed stream 125, comprising CO, H₂, H₂O, and optionally CO₂, is then fed into a first shift reactor 127. The first shift reactor can be operated under a first set of shifting conditions comprising the presence of a first shift catalyst loaded therein. Due to the relatively high temperature in the first set of shifting conditions, the first shift reactor 127 is sometimes called a high-temperature shift reactor. On contacting the first shift catalyst under the first set of shifting conditions, the forward reaction of the following preferentially occurs:

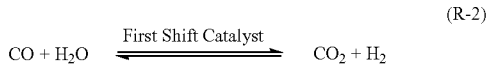

(R-2)

Thus, a first shifted stream 129 comprising CO at a lower concentration than stream 125 and $CO_2$ at a higher concentration than stream 125 exits the first shift reactor 127. Because the forward reaction above is exothermic, stream 129 has a higher temperature than stream 125 assuming the first shift reactor 127 is an adiabatic reactor.

The first shifted stream 129 can then be further cooled down at heat exchanger 131 by any suitable stream having a temperature lower than stream 129. As shown in FIG. 1, in a preferred embodiment, a boiler feed water stream 134, supplied from a boiler feed water treatment unit 133, is used to cool down stream 129. The thus heated boiler feed water stream 135 exiting the heat exchanger 131 can be supplied to steam drum 171 and at least partly supplied to the WHB 123, to produce high-pressure steam stream 167 as described earlier, or to any other suitable steam generator. Alternatively or additionally (not shown), the hydrocarbon feed stream 103, or a portion thereof, may be heated by stream 129 at heat exchanger 131 or another heat exchanger upstream or downstream of heat exchanger 131.

The cooled first shifted stream 136 exiting heat exchanger 131, comprising CO, $H_2$, $H_2O$, and $CO_2$, is then fed into a second shift reactor 137. The second shift reactor can be operated under a second set of shifting conditions comprising the presence of a second shift catalyst loaded therein and a temperature lower than in the first shift reactor 127. Due to the lower temperature, the second shift reactor 137 is sometimes called a low-temperature shift reactor. On contacting the second shift catalyst under the second set of shifting conditions, the forward reaction of the following preferentially occurs:

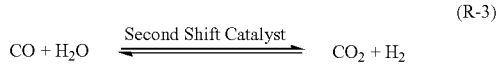

(R-3)

Thus, a second shifted stream 139 comprising CO at a lower concentration than stream 136 and $CO_2$ at a higher concentration than stream 136 exits the second shift reactor 137. Because the forward reaction above is exothermic, stream 139 has a higher temperature than stream 136 assuming the second shift reactor 137 is an adiabatic reactor.

The second shifted stream 139 can then be further cooled down at heat exchanger 141 by any suitable stream having a temperature lower than stream 139. In a preferred embodiment, a boiler feed water stream (not shown) supplied from a boiler feed water treatment unit (e.g., unit 133) can be advantageously used to cool down stream 139. The thus heated boiler feed water stream exiting the heat exchanger 141 can be supplied (not shown) to steam drum 171 and at least partly supplied to the WHB 123, to produce high-pressure steam stream 167 as described earlier, or to any other suitable steam generator. Alternatively or additionally (not shown), the hydrocarbon feed stream 103, or a portion thereof, may be heated by stream 139 at heat exchanger 141 or another heat exchanger upstream or downstream of heat exchanger 141.

The cooled stream 143 exiting heat exchanger 141 can be further cooled at heat exchanger 145 by any suitable cooling medium having a lower temperature than stream 143, e.g., a cooling water stream, ambient air (using an air-fin cooler, e.g.), and the like. Preferably, a portion of the residual steam in stream 143 is condensed to liquid water in stream 147, which can be fed into a separator 149 to obtain a condensate stream 151 and a vapor stream 153. The steam-abated stream 153, a crude gas mixture, comprises primarily $H_2$ and $CO_2$, and optionally minor amount of residual $CH_4$ and CO.

Stream 153 can then be supplied into a $CO_2$ recovery unit 155 to produce a $CO_2$ stream 157 and an $H_2$-rich stream 159. Any suitable $CO_2$ recovery unit known in the art may be used. A preferred $CO_2$ recovery unit is an amine absorption and regeneration unit, where the crude gas mixture stream 153 contacts a counter-current stream of amine which absorbs the $CO_2$, which is subsequently released from the amine upon heating ("regeneration"). The $CO_2$ stream 157 can be supplied to a $CO_2$ pipeline and conducted away. The $CO_2$ stream 157 can be compressed, liquefied, stored, sequestered, or utilized in manners known to one skilled in the art.

The $H_2$-rich stream 159 can advantageously comprise $H_2$ at a molar concentration from, e.g., 80%, 81%, 82%, 83%, 84%, 85%, to 86%, 87%, 88%, 89%, 90%, to 91%, 92%, 93%, 94%, 95%, to 96%, 97%, 98%, 99%, based on the total moles of molecules in stream 159. In addition to $H_2$, stream 159 may comprise: (i) $CH_4$ at a molar concentration thereof based on the total moles of molecules in stream 159, from, e.g., 0.1%, 0.3%, 0.5%, 0.8%, to 1%, 2%, 3%, 4%, or 5%; (ii) CO at a molar concentration thereof based on the total moles of molecules in stream 159, from, e.g., 0.1%, 0.3%, 0.5%, 0.8%, to 1%, 2%, or 3%; and (iii) $CO_2$ at a molar concentration thereof based on the total moles of molecules in stream 159, from, e.g., 0.1%, 0.2%, 0.3%, 0.4%, 0.5%, to 0.6%, 0.7%, 0.8%, 0.9%, or 1%. Stream 159 can be advantageously used as a fuel gas for residential, office, and/or industrial heating, preferably industrial heating. Due to the high concentration of $H_2$ and low concentration of carbon-containing molecules therein, the combustion of stream 159 in the presence of an oxidant such as air, oxygen, and the like, can produce a flue gas stream comprising $CO_2$ at a low concentration. In certain embodiments, the flue gas stream can comprises $CO_2$ at a molar concentration based on the total moles of $H_2O$ and $CO_2$ in the flue gas stream of no greater than 20% (e.g., from 0.1%, 0.2%, 0.4%, 0.5%, to 0.6%, 0.8%, 1%, to 2%, 4%, 5%, to 6%, 8%, 10%, to 12%, 14%, 15%, to 16%, 18 mol %, or 20%). The flue gas stream can be advantageously exhausted into the atmosphere without the need to separate and capture $CO_2$ therefrom.

In a preferred embodiment, as shown in FIG. 1, a split stream 117 of stream 159 can be supplied to the SMR 115, where it is combusted in burner(s) 118 to supply thermal energy to the SMR 115 heating the lower radiant section 116 and tube(s) 120b therein and the convection section 114 and tube 120a therein. The flue gas stream 119 exiting the SMR 115 comprises $CO_2$ at a low concentration, and therefore can be exhausted into the atmosphere without the need to separate and capture $CO_2$ therefrom.

FIG. 2

Figure 2:
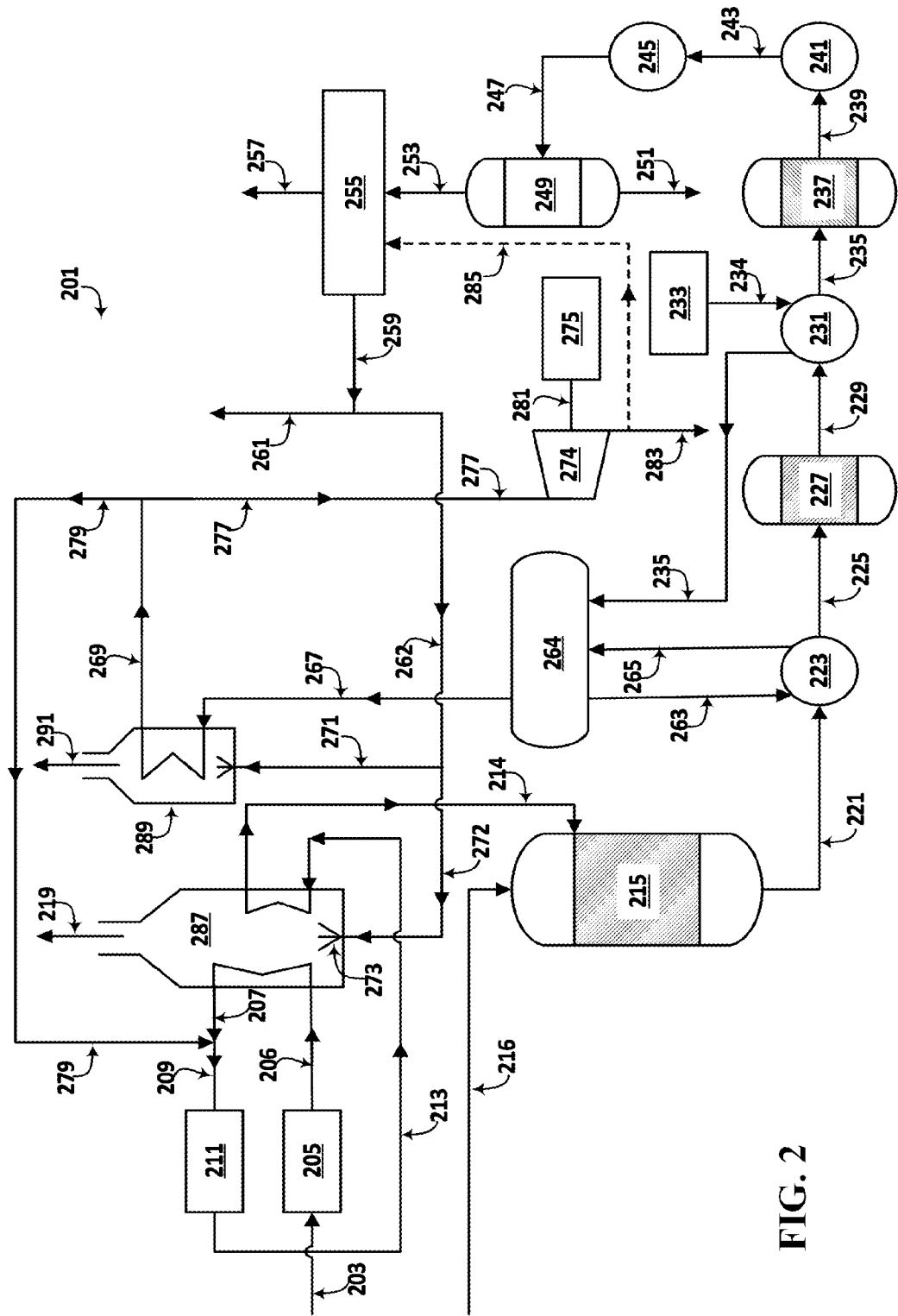
FIG. 2 schematically illustrates certain processes and systems for producing a $H_2$-rich stream including an ATR according to certain embodiments of this disclosure.

FIG. 2 schematically illustrates processes/systems 201 including an ATR for producing a $H_2$-rich fuel stream. As shown, a hydrocarbon feed stream 203 (e.g., a natural gas stream comprising primarily $CH_4$), which may contain $CH_4$, C2+ hydrocarbons at various concentrations, and sulfur-containing compounds at various concentrations, is first fed into an optional sulfur removal unit 205 to produce a sulfur-abated stream 206, to prevent poisoning catalysts used in the downstream process steps such as the catalyst used in the pre-reformer and the ATR unit described below.

Upon optional preheating via, e.g., a heat exchanger (not shown) or a furnace 287 a heated stream 207 is produced. Stream 207 is then combined with an HPS stream 279 to form a hydrocarbon/steam mixture stream 209. Upon optional preheating via, e.g., a heat exchanger or a furnace (not shown), stream 209 can be then fed into a pre-reformer 211 which can be an adiabatic reactor containing a pre-reforming catalyst therein. On contacting the pre-reforming catalyst, the heavier C2+ hydrocarbons are preferentially converted into methane (thus preventing the formation of coke in the downstream primary reforming reactor) to produce a pre-reforming effluent 213 comprising methane and steam. Upon optional heating in furnace 287, stream 213 becomes a heated stream 212, which is then fed into an ATR 215, an $O_2$ stream 216, which may be produced by air separation, is also fed into ATR 215.

A forming catalyst is loaded in ATR 215. On contacting the reforming catalyst, the forward reaction of the following preferentially occurs under syngas producing conditions:

(R-1)

In addition, various amounts of $CO_2$ may be produced in the ATR. Thus, a reformed stream 221 comprising CO, $H_2$, residual $H_2O$, optionally residual $CH_4$ at various concentrations, and optionally various amount of $CO_2$ exits ATR 115 at a temperature of e.g., from 800° C. to 1200° C. and an absolute pressure from 700 kPa to 5,000 kPa. Stream 221 is then cooled at a waste heat recovery unit ("WHRU") including a waste heat boiler ("WHB") 223 and a steam drum 264 to produce a cooled reformed stream 225 and to generate an HPS stream 267. As shown, a water stream 263 flows from steam drum 264 to WHB 223, and a steam-water stream 265 flows from WHB 223 to steam drum 264.

Stream 267, preferably a saturated steam stream, can be then heated in an auxiliary furnace 289 to produce a super-heated, high-pressure steam ("SH-HPS") stream 269, which can be fed into a steam header and supplied to any suitable equipment or process step. Furnace 289 may be the same furnace as furnace 287 or a separate furnace. For example, as shown and described above, a split stream 279 of stream 269 can be combined with the sulfur-abated hydrocarbon feed stream 207 to form a combined stream 209, which is then fed into the pre-reformer 211. For another example, a split stream 277 of stream 269 can be fed into a steam turbine 274, where it is expanded to produce an exhaust steam stream 283 and shaft power. The shaft power can be transferred, via shaft 281, to any suitable equipment 275 to produce useful mechanical work. One example of equipment 275 is an electricity generator, which converts the mechanical work into electrical energy transmissible to any suitable local or distant electrical equipment. Exhaust steam stream 283 can have various residual pressure and temperature suitable for, e.g., driving additional steam turbines, heating other equipment and/or streams, and the like.

As shown in FIG. 2, the cooled reformed stream 225, comprising CO, $H_2$, $H_2O$, and optionally $CO_2$, is then fed into a first shift reactor 227. The first shift reactor can be operated under a first set of shifting conditions comprising the presence of a first shift catalyst loaded therein. Due to the relatively high temperature in the first set of shifting conditions, the first shift reactor 227 is sometimes called a high-temperature shift reactor. On contacting the first shift catalyst under the first set of shifting conditions, the forward reaction of the following preferentially occurs:

(R-2)

Thus, a first shifted stream 229 comprising CO at a lower concentration than stream 225 and $CO_2$ at a higher concentration than stream 225 exits the first shift reactor 227. Because the forward reaction above is exothermic, stream 229 has a higher temperature than stream 225 assuming the first shift reactor 227 is an adiabatic reactor.

The first shifted stream 229 can then be further cooled down at heat exchanger 231 by any suitable stream having a temperature lower than stream 229. As shown in FIG. 2, in a preferred embodiment, a boiler feed water stream 234, supplied from a boiler feed water treatment unit 233, can be used to cool down stream 229. The thus heated boiler feed water stream 235 exiting the heat exchanger 231 can be supplied to steam drum 264 and at least partly subsequently supplied to the WHB 223, to produce high-pressure steam stream 267 as described earlier, or to any other suitable steam generator. Alternatively or additionally (not shown), the hydrocarbon feed stream 203, or a portion thereof, may be heated by stream 229 at heat exchanger 231 or another heat exchanger upstream or downstream of heat exchanger 231.

The cooled first shifted stream 235 exiting heat exchanger 231, comprising CO, $H_2$, $H_2O$, and $CO_2$, is then fed into a second shift reactor 237. The second shift reactor can be operated under a second set of shifting conditions comprising the presence of a second shift catalyst loaded therein and a temperature lower than in the first shift reactor 227. Due to the lower temperature, the second shift reactor 237 is sometimes called a low-temperature shift reactor. On contacting the second shift catalyst under the second set of shifting conditions, the forward reaction of the following preferentially occurs:

(R-3)

Thus, a second shifted stream 239 comprising CO at a lower concentration than stream 235 and $CO_2$ at a higher concentration than stream 235 exits the second shift reactor 237. Because the forward reaction above is exothermic, stream 239 has a higher temperature than stream 236 assuming the second shift reactor 237 is an adiabatic reactor.

The second shifted stream 239 can then be further cooled down at heat exchanger 241 by any suitable stream having a temperature lower than stream 239. In a preferred embodiment, a boiler feed water stream (not shown) supplied from a boiler feed water treatment unit (e.g., unit 233) can be advantageously used to cool down stream 239. The thus heated boiler feed water stream exiting the heat exchanger 241 can be supplied (not shown) to steam drum 264 and at least partly supplied to the WHB 223, to produce high-pressure steam stream 267 as described earlier, or to any other suitable steam generator. Alternatively or additionally (not shown), the hydrocarbon feed stream 203, or a portion thereof, may be heated by stream 239 at heat exchanger 241 or another heat exchanger upstream or downstream of heat exchanger 241.

The cooled stream 243 exiting heat exchanger 241 can be further cooled at heat exchanger 245 by any suitable cooling medium having a lower temperature than stream 243, e.g., a cooling water stream, ambient air (using an air-fin cooler, e.g.), and the like. Preferably, a portion of the residual steam in stream 243 is condensed to liquid water in stream 247, which can be fed into a separator 249 to obtain a condensate stream 251 and a vapor stream 253. The steam-abated stream 253, a crude gas mixture stream, comprises primarily $H_2$ and $CO_2$, and optionally minor amount of residual $CH_4$ and CO.

Stream 253 can then be supplied into a $CO_2$ recovery unit 255 to produce a $CO_2$ stream 257 and an $H_2$-rich stream 259. Any suitable $CO_2$ recovery unit known in the art may be used. A preferred $CO_2$ recovery unit is an amine absorption and regeneration unit, where the crude gas mixture stream 253 contacts a counter-current stream of amine which absorbs the $CO_2$, which is subsequently released from the amine upon heating ("regeneration"). The $CO_2$ stream 257 can be supplied to a $CO_2$ pipeline and conducted away. The $CO_2$ stream 257 can be compressed, liquefied, stored, sequestered, or utilized in manners known to one skilled in the art.

The $H_2$-rich stream 259 can advantageously comprise $H_2$ at a molar concentration from, e.g., 80%, 81%, 82%, 83%, 84%, 85%, to 86%, 87%, 88%, 89%, 90%, to 91%, 92%, 93%, 94%, 95%, to 96%, 97%, 98%, 99%, based on the total moles of molecules in stream 259. In addition to $H_2$, stream 259 may comprise: (i) $CH_4$ at a molar concentration thereof based on the total moles of molecules in stream 259, from, e.g., 0.1%, 0.3%, 0.5%, 0.8%, to 1%, 2%, 3%, 4%, or 5%; (ii) CO at a molar concentration thereof based on the total moles of molecules in stream 259, from, e.g., 0.1%, 0.3%, 0.5%, 0.8%, to 1%, 2%, or 3%; and (iii) $CO_2$ at a molar concentration thereof based on the total moles of molecules in stream 259, from, e.g., 0.1%, 0.2%, 0.3%, 0.4%, 0.5%, to 0.6%, 0.7%, 0.8%, 0.9%, or 1%. Stream 259 can be advantageously used as a fuel gas for residential, office, and/or industrial heating. Due to the high concentration of $H_2$ and low concentration of carbon-containing molecules therein, the combustion of stream 259 in the presence of an oxidant such as air, oxygen, and the like, can produce a flue gas stream comprising $CO_2$ at a low concentration. In certain embodiments, the flue gas stream can comprises $CO_2$ at a molar concentration based on the total moles of $H_2O$ and $CO_2$ in the flue gas stream of no greater than 20% (e.g., from 0.1%, 0.2%, 0.4%, 0.5%, to 0.6%, 0.8%, 1%, to 2%, 4%, 5%, to 6%, 8%, 10%, to 12%, 14%, 15%, to 16%, 18 mol %, or 20%). The flue gas stream can be advantageously exhausted into the atmosphere without the need to separate and capture $CO_2$ therefrom.

In a preferred embodiment, as shown in FIG. 2, a split stream 272 of stream 262 (which is a split stream of stream 259) can be supplied to furnace 287, where it is combusted to preheat the de-sulfured hydrocarbon stream 206, and a split stream 271 of stream 262 can be supplied to furnace 289, where it is combusted to superheat steam stream 267. The flue gas streams 219 and 291 exiting furnaces 287 and 289 comprise $CO_2$ at a low concentration, and therefore can be exhausted into the atmosphere without the need to separate and capture $CO_2$ therefrom.

FIG. 3

Figure 3:
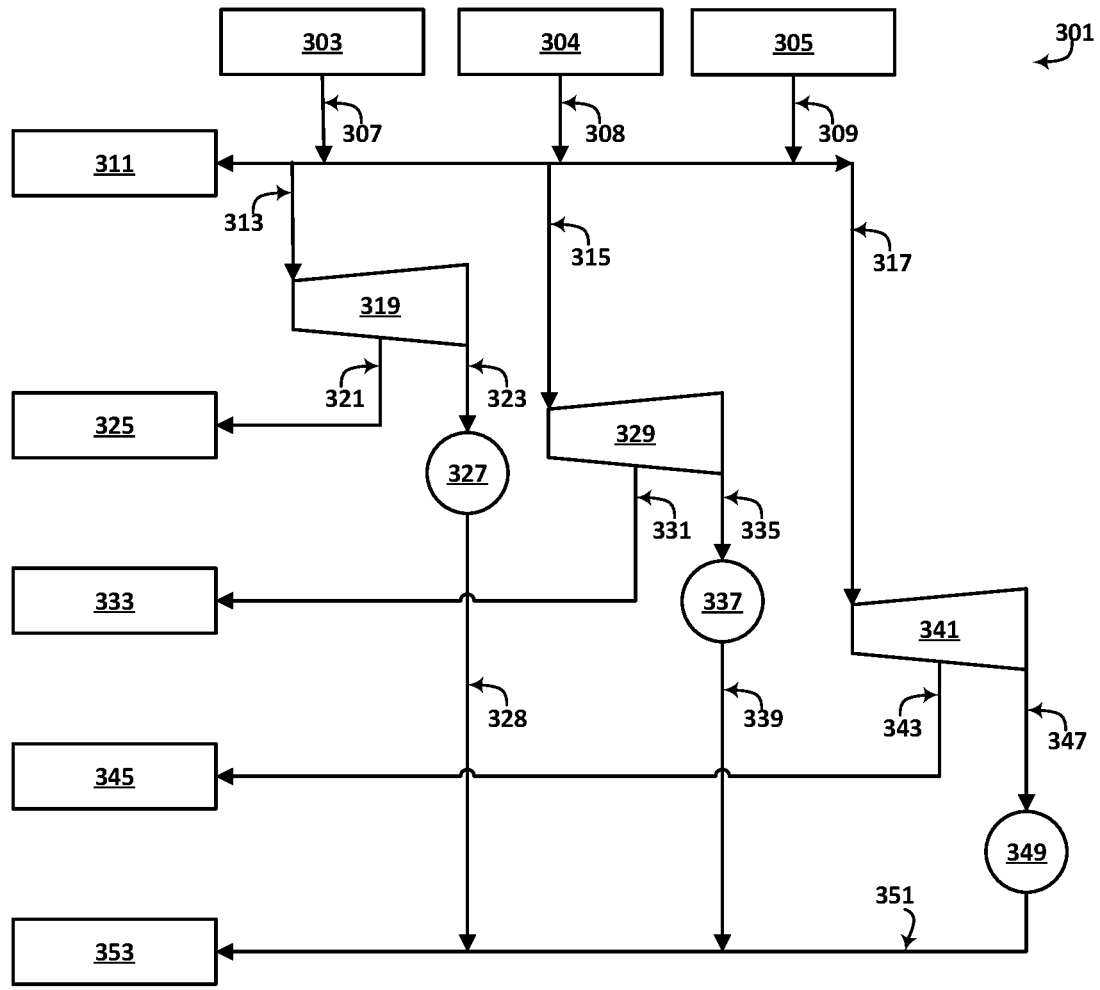
FIG. 3 schematically illustrates a process/system with steam integration between a syngas producing unit and an olefins production plant.

FIG. 3 schematically illustrates an inventive process/system 301 with advantageous steam integration between a syngas or $H_2$-rich fuel gas production unit and an olefins production plant including a stream cracker furnace. An SH-HPS stream (preferably a Super-HPS stream) 307 is generated from the WHRU of a syngas and/or $H_2$-rich fuel gas production process 303 as described above. One or more SH-HPS stream(s) (preferably Super-HPS stream(s)) 308 are produced from one or more steam cracker furnace(s) 304. One or more SH-HPS stream(s) (preferably Super-HPS stream(s)) 309, if needed, are produced from one or more auxiliary steam boiler(s) 305. Streams 307, 308, and 309 may be optionally combined, as shown, at an HPS (preferably Super-HPS) header, from which the SH-HPS (preferably Super-HPS) can be distributed to equipment consuming steam. As shown in FIG. 3, one or more HPS (preferably Super-HPS) stream(s) 313, one or more HPS (preferably Super-HPS) stream(s) 315, and one or more HPS (preferably Super-HPS) stream(s) 317 are supplied to one or more steam turbine(s) 319, one or more steam turbine(s) 329, and one or more steam turbine(s) 341, respectively. Steam turbine(s) 319 can drive one or more process gas compressor(s). Steam turbine(s) 329 can drive one or more propylene refrigeration compressors. Steam turbine(s) 341 can drive one or more ethylene refrigeration compressors. From steam turbine(s) 319, one or more HPS stream(s) 321 may be exhausted. Stream(s) 321 can be used to provide process heat, e.g., to a stream 325 in the olefins production plant or other facilities, or supplied to a steam turbine 325 receiving an HPS stream and exhausting a MPS stream, or supplied to a steam turbine 325 receiving an HPS stream and exhausting a LPS stream, to produce additional mechanical work which can be used to drive another process gas compressor, pumps, and the like. From steam turbine(s) 319, one or more condensable stream(s) 323 may be exhausted, which can be condensed at condenser(s) 327 to produced one or more condensed water stream(s) 328. From steam turbine(s) 329, one or more MPS stream(s) 331 may be exhausted. Stream(s) 331 can be used to provide process heat, e.g., to a stream 333 in the olefins production plant or other facilities, or supplied to a steam turbine 333 receiving a MPS stream and exhausting a LPS stream, to produce additional mechanical work which can be used to drive another compressor, pumps, and the like. From steam turbine(s) 329, one or more condensable stream(s) 335 may be exhausted, which are then condensed at condenser(s) 337 to produced one or more condensed water stream(s) 339. From steam turbine(s) 341, one or more LPS stream(s) 343 may be exhausted. Stream(s) 343 can be used to provide process heat, e.g., to a stream 345 in the olefins production plant or other facilities. From steam turbine(s) 341, one or more condensable stream(s) 347 may be exhausted, which are then condensed at condenser(s) 349 to produced one or more condensed water stream(s) 351. Condensed water streams 328, 339, and 351 may be combined and processed together at location 353, which can be subsequently reused in the facility. Without stream 307, to satisfy the steam consumption needs of the various steam turbines driving the various compressors, pumps, generators, and process heating, boiler(s) 305 are required, which consume considerable amount of fuel and may produce considerable amount of $CO_2$ emission if a hydrocarbon fuel is used. With stream 307 supplied from a syngas and/or $H_2$-rich fuel gas production unit 303 integrated into the process/system, to satisfy the steam consumption needs of the same steam turbines and process heating, boiler(s) 305 is required at a reduced size, or may be eliminated entirely, resulting in reduced fuel consumption in and reduced $CO_2$ emission from the olefins production plant.

Figure 4:
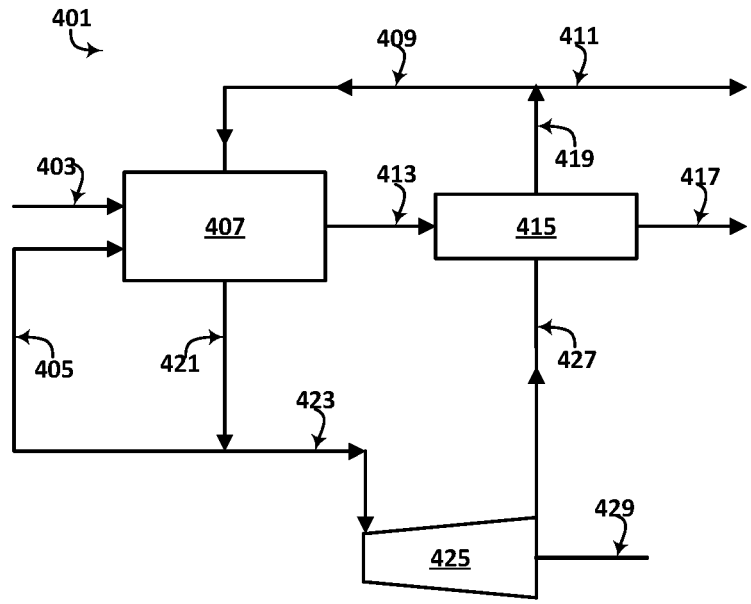
FIG. 4 schematically illustrates a comparative SMR waste heat recovery process in which the HPS stream generated by a waste-heat recovery unit is directly fed into the SMR.

FIG. 4 (Comparative)

FIG. 4 schematically illustrates a comparative SMR waste heat recovery process/system 401 in the prior art. A natural gas feed stream 403 at a flow rate of 83.6 tons per hour ("tph") and a steam stream 405 having a temperature of 378° C., an absolute pressure of 3,500 kPa, and a flow rate of 238.9 tph are fed into an H$_2$-rich fuel gas production unit 407. Unit 407 comprises an SMR in which the natural gas/steam mixture is heated to an elevated temperature and reformed under syngas producing conditions to produce a reformed stream comprising H$_2$, CO, and residual CH$_4$, a waste-heat recovery unit ("WHRU") cooling the reformed stream and producing an HPS stream 421 with a flow rate of 435.8 tph and an absolute pressure of 3,500 kPa and temperature of 378° C., a shift reactor receiving the cooled reformed stream to convert a portion of the CO in the cooled reformed stream to CO$_2$ and to produce a shifted stream, a steam abatement unit for removing H$_2$O from the shifted stream to produce a crude gas mixture stream 413 comprising H$_2$, CO$_2$, and CH$_4$. Stream 413 is then fed into a CO$_2$ recovery unit 415 using an amine absorption/regeneration process, to produce a CO$_2$ stream 417 and a H$_2$-rich stream 419. A split stream 409 of stream 419 is fed into the SMR and combusted to heat the SMR and produce a flue gas having a low CO$_2$ concentration. Another split stream 411 of stream 419 can be supplied as fuel gas to other equipment where it can be combusted to provide heating. The CO$_2$ stream 417 can be optionally compressed, liquefied, conducted away, stored, sequestered, or utilized.

A split stream 405 of HPS stream 421, with a flow rate of 238.9 tph, is fed into the SMR of unit 407. Another split stream 423 of stream 421, with a flow rate of 196.9 tph, is supplied to a steam turbine 425 having an isentropic efficiency of 75%, where it expands to produce 18.6 megawatt ("MW") of shaft power, which can be used to drive a generator, and an LPS stream at a flow rate of 196.9 tph. The generator is sometimes called a "power island" in a SMR hydrogen plant. The LPS stream can be supplied to the CO$_2$ recovery unit 415 to provide heat needed to regenerate the amine.

FIG. 5

Figure 5:
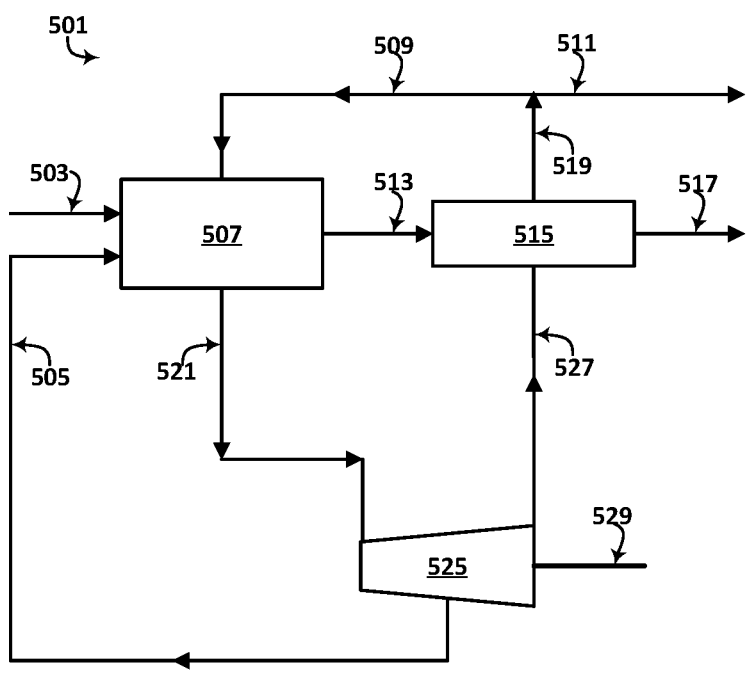
FIGS. 5, 6, and 7 schematically illustrate inventive waste heat recovery processes according to certain embodiments of this disclosure.

FIG. 5 schematically illustrates an inventive waste heat recovery process/system 501 of this disclosure. A natural gas feed stream 503 at a flow rate of 83.6 tph and a steam stream 505 having a temperature of 378° C., an absolute pressure of 3,500 kPa, and a flow rate of 238.9 tph are fed into an H$_2$-rich fuel gas production unit 507, which is similar to the unit 407 in FIG. 4. Unit 507 comprises an SMR in which the natural gas/steam mixture is heated to an elevated temperature and reformed under syngas producing conditions to produce a reformed stream comprising H$_2$, CO, and residual CH$_4$, a WHRU cooling the reformed stream and producing an Super-HPS stream 521 subsequently superheated to 520° C. with a flow rate of 404.6 tph and an absolute pressure of 12,100 kPa, a shift reactor receiving the cooled reformed stream to convert a portion of the CO in the cooled reformed stream to CO$_2$ and to produce a shifted stream, a steam abatement unit for removing H$_2$O from the shifted stream to produce a crude gas mixture stream 513 comprising H$_2$, CO$_2$, and CH$_4$. Stream 513 is then fed into a CO$_2$ recovery unit 515 using an amine absorption/regeneration process, to produce a CO$_2$ stream 517 and a H$_2$-rich stream 519. A split stream 509 of stream 519 is fed into the SMR, and combusted to heat the SMR and produce a flue gas having a low CO$_2$ concentration. Another split stream 511 of stream 519 can be supplied as fuel gas to other equipment where it can be combusted to provide heating. The CO$_2$ stream 517 can be optionally compressed, liquefied, conducted away, stored, sequestered, or utilized.

The superheated Super-HPS stream 521, with a flow rate of 404.6 tph, is fed into a steam turbine 525 having an isentropic efficiency of 75%, where it expands to produce an HPS stream 505 having the temperature and flow rate as described above, an LPS stream 627, and 41.5 MW of shaft power rotating about shaft 529, an increase of 22.9 MW (30,700 hp) over the arrangement of FIG. 4 above. The increased shaft power can be advantageously used to drive a generator or a major compressor such as a process gas compressor, a propylene refrigeration compressor, and/or an ethylene refrigeration compressor in an olefins production plant. Such an arrangement requires a re-balancing of the extraction levels of the major steam turbines in the plant design. This activity of balancing the various steam levels of an olefin plant multi-pressure steam system is well known to those familiar with olefin plant design. By generating the additional 22.9 MW of shaft power from steam generated in the SMR, less SHP steam is required from the boilers on the olefins production plant, with a corresponding saving in boiler fuel consumption and reduction in boiler CO$_2$ emissions. The HPS stream 505 is fed into the SMR as the steam feed. The LPS stream 527, at a flow rate of 165.7 tph, can be supplied to the CO$_2$ recovery unit 515 to provide heat needed to regenerate the amine.

FIG. 6

Figure 6:
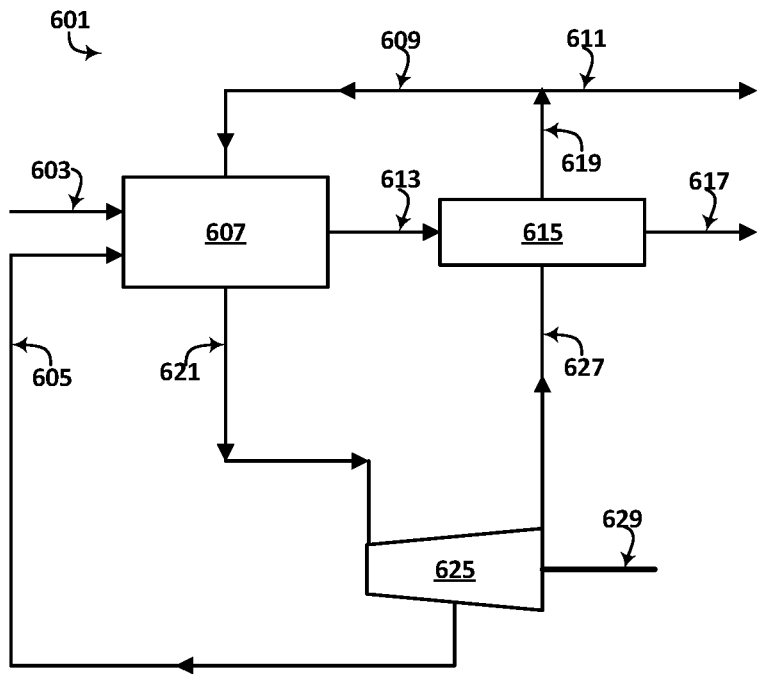

FIG. 6 schematically illustrates an inventive waste heat recovery process/system 601 of this disclosure. A natural gas feed stream 603 at a flow rate of 83.6 tph and an MPS stream 605 having a temperature of 378° C., an absolute pressure of 1,600 kPa, and a flow rate of 238.9 tph are fed into an H$_2$-rich fuel gas production unit 607, which is similar to the unit 407 in FIG. 4. Unit 607 comprises an SMR operated at a lower pressure than the SMR in the process of FIG. 4 to produce a reformed stream at a lower pressure than in the process of FIG. 4 to increase CH$_4$ conversion, a WHRU cooling the reformed stream and producing an Super-HPS stream 621 at 12,446 kPa absolute pressure, subsequently superheated to 520° C. with a flow rate of 404.6 tph and an absolute pressure of about 12,100 kPa, a shift reactor receiving the cooled reformed stream to convert a portion of the CO in the cooled reformed stream to CO$_2$ and to produce a shifted stream, a steam abatement unit for removing H$_2$O from the shifted stream to produce a crude gas mixture stream 613 comprising H$_2$, CO$_2$, and CH$_4$. Stream 613 is then fed into a CO$_2$ recovery unit 615 using an amine absorption/regeneration process, to produce a CO$_2$ stream 617 and a H$_2$-rich stream 619. A split stream 609 of stream 619 is fed into the SMR, and combusted to heat the SMR and produce a flue gas having a low CO$_2$ concentration. Another split stream 611 of stream 619 can be supplied as fuel gas to other equipment where it can be combusted to provide heating. The CO$_2$ stream 617 can be optionally compressed, liquefied, conducted away, stored, sequestered, or utilized.

The Super-HPS stream 621, with a flow rate of 404.6 tph, is fed into a steam turbine 625, where it expands to produce an MPS stream 605 having the temperature and pressure and flow rate described above, an LPS stream 627, and 52.9 MW of shaft power rotating about shaft 629. The shaft power, 34.3 MW (46,000 hp) higher compared to the process of FIG. 4, can be advantageously used to drive a generator or a major compressor such as a process gas compressor, a propylene refrigeration compressor, and/or an ethylene refrigeration compressor in an olefins production plant. As such, less Super-HPS is required from the boilers on the olefins production plant for the steam turbines, saving fuels for the boilers and reducing corresponding CO$_2$ emissions. The MPS stream 605 is fed into the SMR as the steam feed.

The LPS stream 627, at a flow rate of 165.7 tph, is supplied to the $CO_2$ recovery unit 615 to provide heat needed to regenerate the amine

FIG. 7

Figure 7:
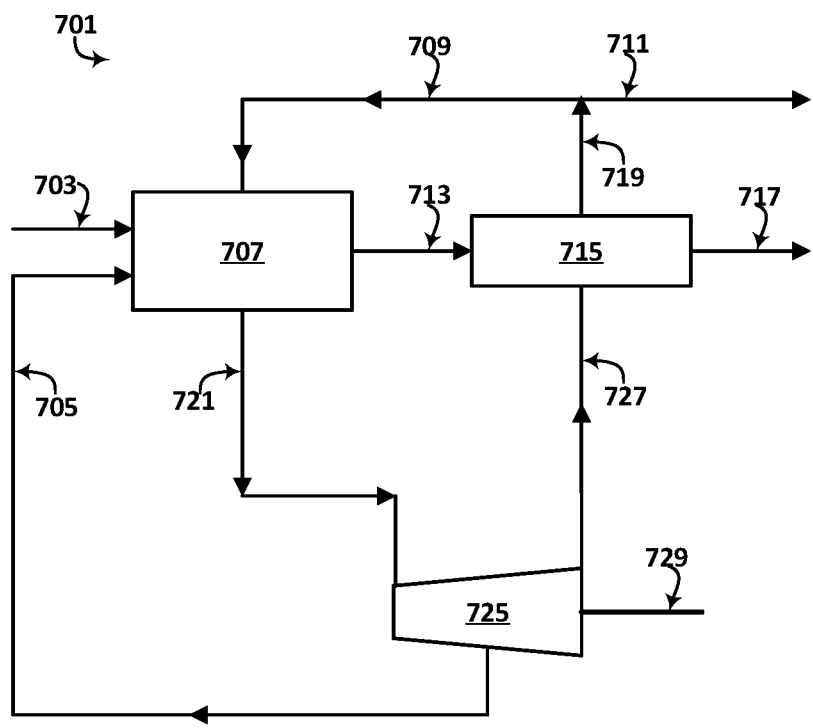

FIG. 7 schematically illustrates an inventive waste heat recovery process/system 701 of this disclosure. A natural gas feed stream 703 at a flow rate of 83.6 tph an MPS stream 705 having a temperature of 378° C., an absolute pressure of 1,600 kPa, and a flow rate of 238.9 tph are fed into an $H_2$-rich fuel gas production unit 707, which is similar to the unit 407 in FIG. 4.

Unit 707 comprises an SMR in which the natural gas/steam mixture is heated to an elevated temperature and reformed under syngas producing conditions to produce a reformed stream comprising $H_2$, CO, and residual $CH_4$, a WHRU cooling the reformed stream and producing an HPS stream 721 with a flow rate of 435.8 tph and an absolute pressure of about 4,300 kPa, a shift reactor receiving the cooled reformed stream to convert a portion of the CO in the cooled reformed stream to $CO_2$ and to produce a shifted stream, a steam abatement unit for removing $H_2O$ from the shifted stream to produce a crude gas mixture stream 713 comprising $H_2$, $CO_2$, and $CH_4$. Stream 713 is then fed into a $CO_2$ recovery unit 715 using an amine absorption/regeneration process, to produce a $CO_2$ stream 717 and a $H_2$-rich stream 719. A split stream 709 of stream 719 is fed into the SMR, and combusted to heat the SMR and produce a flue gas having a low $CO_2$ concentration. Another split stream 711 of stream 719 can be supplied as fuel gas to other equipment where it can be combusted to provide heating. The $CO_2$ stream 717 can be optionally compressed, liquefied, conducted away, stored, sequestered, or utilized.

The HPS stream 721, with a flow rate of 435.8 tph, is fed into a steam turbine 725, where it expands to produce an MPS stream 705 having the temperature, pressure and flow rate described above, an LPS stream 727, and 30.1 MW of shaft power rotating about shaft 729. The shaft power, 11.5 MW (15,400 hp) higher compared to the process of FIG. 4, can be used to drive a generator or a major compressor such as a process gas compressor, a propylene refrigeration compressor, and/or an ethylene refrigeration compressor in an olefins production plant. As such, less Super-HPS is required from the boilers on the olefins production plant for the steam turbines, saving fuels for the boilers and reducing corresponding $CO_2$ emissions. The MPS stream 705 is fed into the SMR as the steam feed. The LPS stream 527, at a flow rate of 165.7 tph, is supplied to the $CO_2$ recovery unit 715 to provide heat needed to regenerate the amine.

In addition to the energy savings described and illustrated above, we have found that significant capital investment savings may be realized by integrating a reforming process with the steam system of an olefins production plant.

An olefins production plant is generally equipped with a water demineralization plant to provide high quality water to the cracking furnace quench exchanger systems, and to the boilers and/or COGEN units associated with the plant. If a "stand-alone" syngas producing unit including an SMR and/or ATR is used to generate a syngas, a $H_2$-rich fuel gas stream, or a high-purity hydrogen stream, then the syngas producing unit will have to be equipped with its own dedicated water demineralization plant. If a syngas producing unit is integrated with the steam system of an olefins production plant, not only does it reduce the boiler firing required for the olefins production plant, but the WHRU associated with the syngas producing unit can draw the high-quality boiler-feed water required from the olefins production plant's water demineralization plant.

Moreover, if a "stand-alone" hydrogen plant including a syngas producing unit is used to generate a syngas, or an $H_2$-rich fuel gas stream, or a high-purity hydrogen stream, then the syngas producing unit will require its own dedicated "power island" comprising a steam turbine to expand the excess HP steam generated by the WHRU, electrical generator and, if the steam turbine operates on a condensing cycle, a surface condenser, cooling tower and cooling water circulation system. If a syngas producing unit is integrated with the olefins production plant's steam system, the steam generated in the WHRU can be expanded in the steam-turbines in the olefins production plant, thus enabling the investment of the "power island" of the stand-alone hydrogen plant to be saved.

This disclosure can further include the following non-limiting embodiments:

A1. A process comprising:

(A) supplying a hydrocarbon feed and a steam feed into a syngas producing unit comprising a reforming reactor under syngas producing conditions to produce a reformed stream exiting the reforming reactor, wherein the syngas producing conditions include the presence of a reforming catalyst, and the reformed stream comprises $H_2$, CO, and steam;

(B) cooling the reformed stream by using a waste heat recovery unit ("WHRU") to produce a cooled reformed stream and to generate a high-pressure steam ("HPS") stream;

(C) heating the HPS stream to obtain a super-heated high-pressure steam ("SH-HPS") stream, wherein the SH-HPS stream has a pressure higher than a pressure of the steam feed supplied to the syngas producing unit in step (A);

(D) expanding at least a portion of the SH-HPS stream in at least one steam turbine to produce shaft power and an expanded steam stream having a pressure equal to or higher than the steam feed, wherein the at least one steam turbine is located in a hydrocarbon production plant; and (E) supplying at least a portion of the expanded steam stream as the steam feed in step (A).

A2. The process of A1, wherein the syngas producing unit comprises a steam-methane-reformer ("SMR") and/or an autothermal reformer ("ATR").

A3. The process of A2, wherein:

the syngas producing unit comprises a SMR; and the SMR comprises: a plurality of SMR burners where a SMR fuel combusts to supply thermal energy to the SMR; a radiant section heated by the thermal energy in which the hydrocarbon feed and steam reacts under the syngas producing conditions; a convection section heated by the thermal energy in which the hydrocarbon feed and steam are preheated before entering the radiant section.

A4. The process of A3, wherein step (C) comprises:

heating the HPS stream generated in step (B) in the convection section of the SMR and/or an auxiliary furnace to obtain the SH-HPS stream, wherein the SH-HPS stream obtained in step (C) has at least one of the following: a temperature from 350° C. to 550° C., and a pressure from 4000 kPa to 14,000 kPa.

A5. The process of A2, wherein:

the syngas producing unit comprises an ATR;

an $O_2$ stream is fed into the ATR;

the ATR comprises a reaction vessel into which the hydrocarbon feed, the steam feed, and the $O_2$ stream are fed;

the reforming conditions comprises the presence of an ATR catalyst in the reaction vessel; and the reformed stream has at least one of the following: a temperature from 800° C. to 1100° C.; and an absolute pressure from 2,000 kPa to 5,000 kPa.

A6. The process of A5, wherein step (C) comprises:

heating the HPS stream generated in step (B) in an auxiliary furnace to obtain the SH-HPS stream, wherein the SH-HPS stream obtained in step (C) has at least one of the following: a temperature from 350° C. to 550° C., and a pressure from 4,000 kPa to 14,000 kPa.

A7. The process of any of A1 to A6, wherein the expanded steam stream produced in step (D) has at least one of the following: a temperature from 260° C. to 405° C.; and an absolute pressure from 1,380 kPa to 4,500 kPa.

A8. The process of any of A1 to A7, wherein the shaft power produced in step (D) drives a compressor located in an olefins production plant including a steam cracker therein operated under steam cracking conditions to convert a steam cracker feed into a steam cracker effluent comprising olefins.

A9. The process of any of A1 to A8, wherein in step (D), one stage of the steam turbine is used.

A10. The process of any of any of A1 to A9, wherein the steam feed in step (A) has an absolute pressure of at least 1,700 kPa, and the SH-HPS stream obtained in step (C) has a temperature of at least 371° C. and an absolute pressure of at least 4,000 kPa.

A11. The process of any of A1 to A10, wherein the steam feed in step (A) has an absolute pressure of at least 1700 kPa, and the SH-HPS stream obtained in step (C) has a temperature of at least 482° C. and an absolute pressure of at least 10,000 kPa.

A12. The process of A11, wherein the steam feed in step (A) has an absolute pressure of at least 2,500 kPa.

A13. The process of any of A1 to A12, wherein step (D) comprises:

(D1) expanding the at least a portion of the SH-HPS stream in a first stage steam turbine to produce shaft power and an intermediate steam stream; and (D2) expanding at least a portion of the intermediate steam stream in a second stage steam turbine to produce additional shaft power and the expanded steam stream.

A14. The process of any of A1 to A13, wherein the SH-HPS stream produced in step (C) is supplied to a HPS header supplying steam to the steam turbine of step (D).

A15. The process of any of A1 to A14, wherein the SH-HPS stream produced in step (C) is a super-high-pressure steam ("Super-HPS") stream having an absolute pressure of 8,370 kPa, and the SH-HPS stream is supplied to a SUPER-HPS header supplying steam to the steam turbine of step (D).

A16. The process of A13, wherein the intermediate steam stream is supplied to a HPS header or a medium pressure steam ("MPS") header, depending on the pressure of the intermediate steam stream, supplying steam to the second stage steam turbine.

A17. The process of any of A13 to A16, wherein the first stage steam turbine drives a process gas compressor located in an olefins production plant having a steam cracker therein.

A18. The process of any of A13 to A17, wherein the second stage steam turbine drives a process gas compressor, a refrigeration compressor, an air compressor, and/or a pump located in the olefins production plant.

A19. The process of A18, wherein the second stage steam turbine drives a propylene refrigeration compressor and/or an ethylene refrigeration compressor.

A20. A process comprising:
(A) supplying a hydrocarbon feed and a steam feed into a syngas producing unit comprising a reforming reactor under syngas producing conditions to produce a reformed stream exiting the reforming reactor, wherein the syngas producing conditions include the presence of a reforming catalyst, and the reformed stream comprises $H_2$, CO, and steam;

(B) cooling the reformed stream by using a waste heat boiler ("WHB") to produce a cooled reformed stream and to generate a high-pressure steam ("HPS") stream;

(C) heating the HPS stream to obtain a super-heated high-pressure steam ("SH-HPS") stream, wherein the SH-HPS stream has a pressure higher than the steam feed supplied to the syngas producing unit in step (A);

(D) expanding at least a portion of the SH-HPS stream in at least one steam turbine to produce shaft power and an expanded steam stream having a pressure equal to or higher than the steam feed, wherein the at least one steam turbine is located in an olefins production plant, and the at least steam turbine drives a process gas compressor located in the olefins production plant; and (E) supplying at least a portion of the expanded steam stream as the steam feed in step (A).

A21. The process of A20, wherein step (D) comprises:
(D1) expanding the at least a portion of the SH-HPS stream in a first stage steam turbine to produce shaft power that drives the processor gas compressor and an intermediate steam stream; and (D2) expanding at least a portion of the intermediate steam stream in a second stage steam turbine to produce additional shaft power and the expanded stream.

A22. The process of A20 or A21, wherein the second stage steam turbine drives a process gas compressor, or a refrigeration compressor, located in the olefins production plant.

A23. The process of A22, wherein the second stage steam turbine drives a propylene refrigeration compressor and/or an ethylene refrigeration compressor.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:
1. A process comprising:
(A) supplying a hydrocarbon feed and a steam feed into a syngas producing unit comprising a reforming reactor under syngas producing conditions to produce a reformed stream exiting the reforming reactor, wherein the syngas producing conditions include the presence of a reforming catalyst, and the reformed stream comprises $H_2$, CO, and steam;
(B) cooling the reformed stream by using a waste heat recovery unit ("WHRU") to produce a cooled reformed stream and to generate a high-pressure steam ("HPS") stream;
(C) heating the HPS stream to obtain a super-heated high-pressure steam ("SH-HPS") stream, wherein the

SH-HPS stream has a pressure higher than a pressure of the steam feed supplied to the syngas producing unit in step (A);

(D) expanding at least a portion of the SH-HPS stream in at least one steam turbine to produce shaft power and an expanded steam stream having a pressure equal to or higher than the steam feed, wherein the at least one steam turbine is located in a hydrocarbon production plant; and (E) supplying at least a portion of the expanded steam stream as the steam feed in step (A).

2. The process of claim 1, wherein the syngas producing unit comprises a steam-methane-reformer ("SMR") and/or an autothermal reformer ("ATR").

3. The process of claim 2, wherein:
the syngas producing unit comprises a SMR; and
the SMR comprises: a plurality of SMR burners where a SMR fuel combusts to supply thermal energy to the SMR; a radiant section heated by the thermal energy in which the hydrocarbon feed and steam reacts under the syngas producing conditions; a convection section heated by the thermal energy in which the hydrocarbon feed and steam are preheated before entering the radiant section.

4. The process of claim 3, wherein step (C) comprises:
heating the HPS stream generated in step (B) in the convection section of the SMR and/or an auxiliary furnace to obtain the SH-HPS stream, wherein the SH-HPS stream obtained in step (C) has at least one of the following: a temperature from 350° C. to 550° C., and a pressure from 4000 kPa to 14,000 kPa.

5. The process of claim 2, wherein:
the syngas producing unit comprises an ATR;
an $O_2$ stream is fed into the ATR;
the ATR comprises a reaction vessel into which the hydrocarbon feed, the steam feed, and the $O_2$ stream are fed;
the reforming conditions comprises the presence of an ATR catalyst in the reaction vessel; and
the reformed stream has at least one of the following: a temperature from 800° C. to 1100° C.; and an absolute pressure from 2,000 kPa to 5,000 kPa.

6. The process of claim 5, wherein step (C) comprises:
heating the HPS stream generated in step (B) in an auxiliary furnace to obtain the SH-HPS stream, wherein the SH-HPS stream obtained in step (C) has at least one of the following: a temperature from 350° C. to 550° C., and a pressure from 4,000 kPa to 14,000 kPa.

7. The process of claim 1, wherein the expanded steam stream produced in step (D) has at least one of the following: a temperature from 260° C. to 405° C.; and an absolute pressure from 1,380 kPa to 4,500 kPa.

8. The process of claim 1, wherein the shaft power produced in step (D) drives a compressor located in an olefins production plant including a steam cracker therein operated under steam cracking conditions to convert a steam cracker feed into a steam cracker effluent comprising olefins.

9. The process of claim 1, wherein in step (D), one stage of the steam turbine is used.

10. The process of claim 1, wherein the steam feed in step (A) has an absolute pressure of at least 1,700 kPa, and the SH-HPS stream obtained in step (C) has a temperature of at least 371° C. and an absolute pressure of at least 4,000 kPa.

11. The process of claim 1, wherein the steam feed in step (A) has an absolute pressure of at least 1700 kPa, and the SH-HPS stream obtained in step (C) has a temperature of at least 482° C. and an absolute pressure of at least 10,000 kPa.

12. The process of claim 11, wherein the steam feed in step (A) has an absolute pressure of at least 2,500 kPa.

13. The process of claim 1, wherein step (D) comprises:
(D1) expanding the at least a portion of the SH-HPS stream in a first stage steam turbine to produce shaft power and an intermediate steam stream; and
(D2) expanding at least a portion of the intermediate steam stream in a second stage steam turbine to produce additional shaft power and the expanded steam stream.

14. The process of claim 1, wherein the SH-HPS stream produced in step (C) is supplied to a HPS header supplying steam to the steam turbine of step (D).

15. The process of claim 1, wherein the SH-HPS stream produced in step (C) is a super-high-pressure steam ("Super-HPS") stream having an absolute pressure of ≥8,370 kPa, and the SH-HPS stream is supplied to a SUPER-HPS header supplying steam to the steam turbine of step (D).

16. The process of claim 13, wherein the intermediate steam stream is supplied to a HPS header or a medium pressure steam ("MPS") header, depending on the pressure of the intermediate steam stream, supplying steam to the second stage steam turbine.

17. The process of claim 13, wherein the first stage steam turbine drives a process gas compressor located in an olefins production plant having a steam cracker therein.

18. The process of claim 13, wherein the second stage steam turbine drives a process gas compressor, a refrigeration compressor, an air compressor, and/or a pump located in the olefins production plant.

19. The process of claim 18, wherein the second stage steam turbine drives a propylene refrigeration compressor and/or an ethylene refrigeration compressor.

20. A process comprising:
(A) supplying a hydrocarbon feed and a steam feed into a syngas producing unit comprising a reforming reactor under syngas producing conditions to produce a reformed stream exiting the reforming reactor, wherein the syngas producing conditions include the presence of a reforming catalyst, and the reformed stream comprises $H_2$, CO, and steam;
(B) cooling the reformed stream by using a waste heat boiler ("WHB") to produce a cooled reformed stream and to generate a high-pressure steam ("HPS") stream;
(C) heating the HPS stream to obtain a super-heated high-pressure steam ("SH-HPS") stream, wherein the SH-HPS stream has a pressure higher than the steam feed supplied to the syngas producing unit in step (A);
(D) expanding at least a portion of the SH-HPS stream in at least one steam turbine to produce shaft power and an expanded steam stream having a pressure equal to or higher than the steam feed, wherein the at least one steam turbine is located in an olefins production plant, and the at least steam turbine drives a process gas compressor located in the olefins production plant; and
(E) supplying at least a portion of the expanded steam stream as the steam feed in step (A).

21. The process of claim 20, wherein step (D) comprises:
(D1) expanding the at least a portion of the SH-HPS stream in a first stage steam turbine to produce shaft power that drives the processor gas compressor and an intermediate steam stream; and
(D2) expanding at least a portion of the intermediate steam stream in a second stage steam turbine to produce additional shaft power and the expanded stream.

22. The process of claim 20, wherein the second stage steam turbine drives a process gas compressor, or a refrigeration compressor, located in the olefins production plant.

23. The process of claim 22, wherein the second stage steam turbine drives a propylene refrigeration compressor and/or an ethylene refrigeration compressor.

* * * * *